US012658125B2

(12) United States Patent
Ueno et al.

(10) Patent No.: US 12,658,125 B2

(45) Date of Patent: Jun. 16, 2026

(54) CONTROL DEVICE, DISPLAY DEVICE, AND CONTROL METHOD

(71) Applicant: SHARP KABUSHIKI KAISHA, Sakai City (JP)

(72) Inventors: Masafumi Ueno, Sakai City (JP); Masaaki Moriya, Sakai City (JP); Naoki Shiobara, Sakai City (JP); Masafumi Kawai, Sakai City (JP); Mohammad Reza Kazemi, Sakai City (JP); Hiroyuki Furukawa, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/856,687

(22) PCT Filed: Jun. 3, 2022

(86) PCT No.: PCT/JP2022/022566

§ 371 (c)(1),
(2) Date: Oct. 14, 2024

(87) PCT Pub. No.: WO2023/233639

PCT Pub. Date: Dec. 7, 2023

(65) Prior Publication Data

US 2025/0329297 A1 Oct. 23, 2025

(51) Int. Cl.

*G09G 3/3225* (2016.01)
*G09G 3/20* (2006.01)

(52) U.S. Cl.

CPC ......... *G09G 3/3225* (2013.01); *G09G 3/2003* (2013.01); *G09G 2320/0646* (2013.01)

(58) Field of Classification Search

None

See application file for complete search history.

(56) References Cited

U.S. PATENT DOCUMENTS

| | | | | |
|---|---|---|---|---|
| 7,355,574 | B1 * | 4/2008 | Leon .................... | G09G 3/3233 345/82 |
| 10,163,388 | B2 * | 12/2018 | Zhang .................. | G09G 3/2003 |

(Continued)

FOREIGN PATENT DOCUMENTS

| | | |
|---|---|---|
| JP | 2007-072305 A | 3/2007 |
| JP | 2010-517092 A | 5/2010 |

(Continued)

*Primary Examiner* — Kenneth Bukowski

(74) *Attorney, Agent, or Firm* — ScienBiziP, P.C.

(57) ABSTRACT

A control device includes: a state acquisition unit configured to acquire first state data regarding a state of a first element included in a first self-light-emitting pixel included in a display panel and configured to emit first color light, and second state data regarding a state of a second element included in a second self-light-emitting pixel included in the display panel and configured to emit second color light longer in wavelength than the first color light; and a compensation processing unit configured to perform first compensation of compensating for a temporal change in the first self-light-emitting pixel based on the first state data, and perform second compensation of compensating for a temporal change in the second self-light-emitting pixel based on the first state data and the second state data.

1 Claim, 35 Drawing Sheets

(56) References Cited

U.S. PATENT DOCUMENTS

| | | | | |
|---|---|---|---|---|
| 2011/0080437 | A1* | 4/2011 | Yamashita | G09G 3/3233<br>257/89 |
| 2012/0154453 | A1* | 6/2012 | Yamashita | G09G 3/3225<br>345/77 |
| 2014/0168039 | A1* | 6/2014 | Kim | G09G 3/3208<br>345/82 |
| 2020/0211454 | A1* | 7/2020 | Ohnishi | G09G 3/30 |

FOREIGN PATENT DOCUMENTS

| | | | |
|---|---|---|---|
| JP | 2011-076025 | A | 4/2011 |
| JP | 2014-123126 | A | 7/2014 |

* cited by examiner

CONTROL DEVICE, DISPLAY DEVICE, AND CONTROL METHOD

TECHNICAL FIELD

The disclosure relates to a control device, a display device, and a control method.

BACKGROUND ART

PTL 1 discloses a technique in which a light-receiving element, corresponding to each light-emitting element, always monitors the degradation in the light-emitting element based on the light leakage amount, and a gain of the input image signal is controlled in feedback by a unit of the light-emitting element, according to the level of degradation of the adjoining light-emitting elements.

CITATION LIST

Patent Literature

PTL 1: JP 2007-072305 A

SUMMARY

Technical Problem

In the technique disclosed in PTL 1, providing a light-receiving element corresponding to each light-emitting pixel may increase the cost and suppress the yield. Furthermore, in the technique disclosed in PTL 1, it is necessary to include a light-receiving element in order to compensate for the luminous efficiency of the light-emitting element, and there is a possibility that a display panel that applicable with the technique disclosed in PTL 1 is limited. Therefore, an object of one aspect of the disclosure is to provide a control device, a display device, and a control method that can appropriately compensate for a temporal change in an electrical characteristic of a self-light-emitting pixel.

Solution to Problem

A control device according to one form of the disclosure includes: a state acquisition unit configured to acquire first state data regarding a state of a first element included in a display panel and included in a first self-light-emitting pixel configured to emit first color light and second state data regarding a state of a second element included in the display panel and included in a second self-light-emitting pixel configured to emit second color light longer in wavelength than the first color light; and a compensation processing unit configured to perform first compensation of compensating for a temporal change of the first self-light-emitting pixel based on the first state data and perform second compensation of compensating for a temporal change of the second self-light-emitting pixel based on the first state data and the second state data.

A control device according to another form of the disclosure includes a compensation processing unit in which after first display is performed in a first region included in a display panel including a plurality of first self-light-emitting pixels configured to emit first color light and a plurality of second self-light-emitting pixels configured to emit second color light longer in wavelength than the first color light and second display is performed in a second region included in the display panel, a voltage to be applied to a second self-light-emitting pixel included in the second region is made higher than a voltage to be applied to a second self-light-emitting pixel included in the first region, in the first display, a first self-light-emitting pixel included in the first region emits the first color light at a first gray scale value, and a second self-light-emitting pixel included in the first region emits light at a second gray scale value higher than the first gray scale value, and in the second display, a first self-light-emitting pixel and a second self-light-emitting pixel included in the second region emit light at the second gray scale value.

A display device according to a form of the disclosure includes a control device and a display panel. The display panel includes a plurality of self-light-emitting pixels. The control device includes: a state acquisition unit configured to acquire first state data regarding a state of a first element included in a display panel and included in a first self-light-emitting pixel configured to emit first color light and second state data regarding a state of a second element included in the display panel and included in a second self-light-emitting pixel configured to emit second color light longer in wavelength than the first color light; a compensation processing unit configured to perform first compensation of compensating for a temporal change of the first self-light-emitting pixel based on the first state data and perform second compensation of compensating for a temporal change of the second self-light-emitting pixel based on the first state data and the second state data; and a display control unit configured to drive each self-light-emitting pixel of the plurality of self-light-emitting pixels by supplying each self-light-emitting pixel with a drive voltage determined from a gray scale value corrected by the first compensation or the second compensation, with each self-light-emitting pixel as the first self-light-emitting pixel or the second self-light-emitting pixel.

A control method according to one form of the disclosure includes: acquiring first state data regarding a state of a first element included in a display panel and included in a first self-light-emitting pixel configured to emit first color light and second state data regarding a state of a second element included in the display panel and included in a second self-light-emitting pixel configured to emit second color light longer in wavelength than the first color light; and performing first compensation of compensating for a temporal change in the first self-light-emitting pixel based on the first state data and performing second compensation of compensating for a temporal change in the second self-light-emitting pixel based on the first state data and the second state data.

DESCRIPTION OF EMBODIMENTS

First Embodiment

Figure 1:
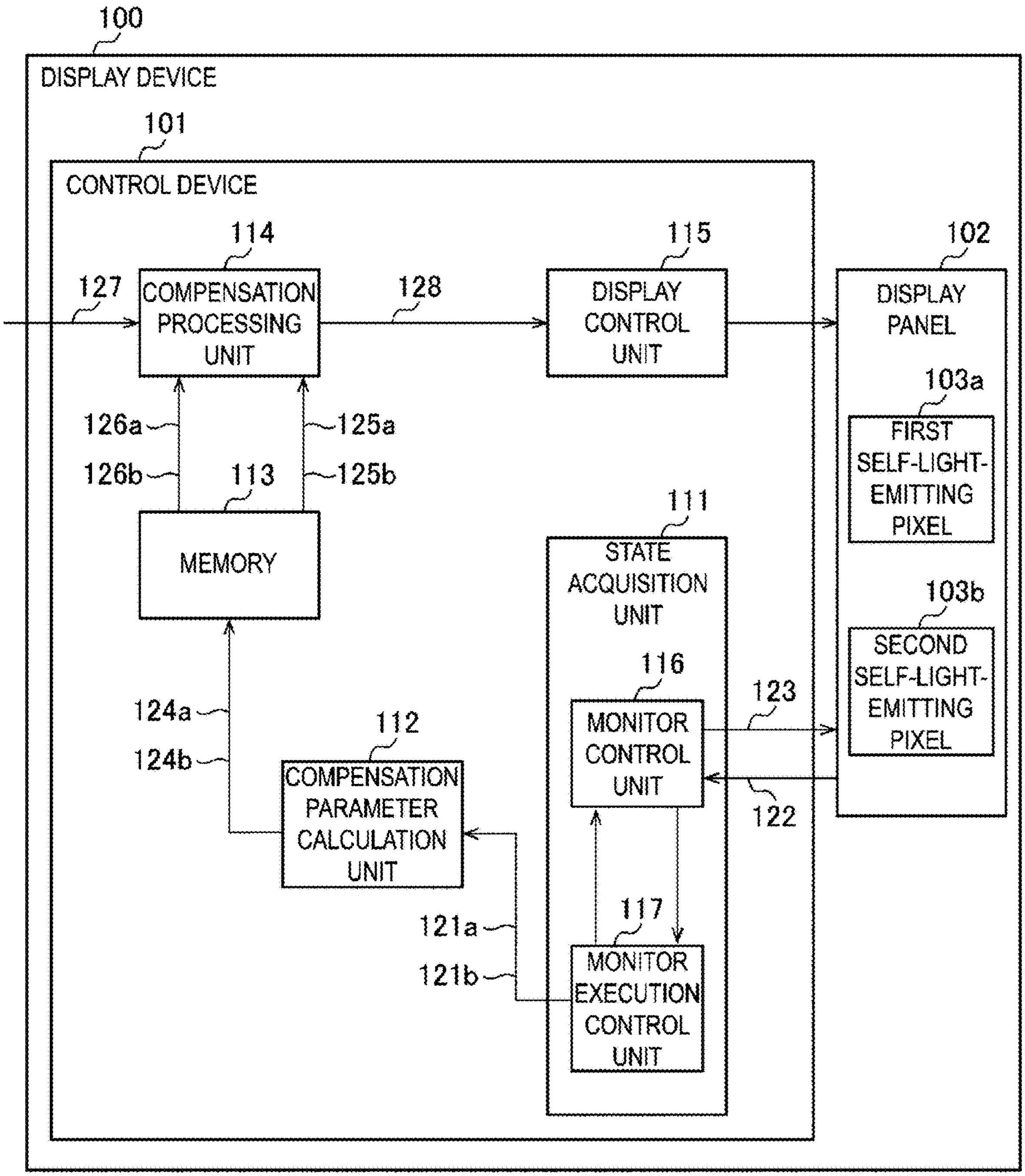
FIG. 1 is a block diagram illustrating an example of a configuration of a display device.

The first embodiment will be described with reference to FIGS. 1 to 14 and 33. Note that in the drawings, identical or equivalent elements are given an identical reference sign, and redundant descriptions thereof may be omitted.

FIG. 1 is a block diagram illustrating an example of the configuration of a display device 100. The display device 100 is an organic electro-luminescence (EL) display device, for example. The display device 100 includes a display panel 102 and a control device 101. The display device 100 corrects an input image in accordance with a characteristic of the display panel 102, and displays a corrected image. In the disclosure, an image refers to two-dimensional data including pixel data of red (R), green (G), and blue (B). In the disclosure, images include not only one piece of two-dimensional data but also a plurality of pieces of two-dimensional data continuous in a time direction (generally called a video in some cases).

The display panel 102 includes a plurality of self-light-emitting pixels 103. Specifically, the display panel 102 includes a plurality of first self-light-emitting pixels 103*a* and a plurality of second self-light-emitting pixels 103*b*. The first self-light-emitting pixels 103*a* are included in the display panel 102 and emit first color light. The second self-light-emitting pixels 103*b* are included in the display panel 102 and emit second color light longer in wavelength than the first color light. For example, the first color light is blue light, and the second color light is red light or green light. Alternatively, the first color light may be green light, and the second color light may be red light. Note that in the following description, when the first self-light-emitting pixel 103*a* and the second self-light-emitting pixel 103*b* are not distinguished, they are called self-light-emitting pixel 103.

The self-light-emitting pixel 103 includes a self-light-emitting element L1, a write control transistor T1, a drive transistor T2, and a measurement transistor T3.

For example, the self-light-emitting element L1 is an organic EL element. That is, the first self-light-emitting pixel 103*a* and the second self-light-emitting pixel 103*b* include an organic EL element. Alternatively, for example, the self-light-emitting element L1 may be an EL element including quantum dots. That is, the first self-light-emitting pixel 103*a* and the second self-light-emitting pixel 103*b* may include an EL element including quantum dots.

The write control transistor T1, the drive transistor T2, and the measurement transistor T3 are thin film transistors (TFT), for example. Note that the transistor may be of a type having a channel layer formed of amorphous silicon, a type having a channel layer formed of low-temperature polysilicon, or a type having a channel layer formed of an oxide semiconductor. For example, the oxide semiconductor may be indium gallium zinc oxide (IGZO). The transistor may be of a top gate type or a bottom gate type. As the transistor, an N-channel type may be used or a P-channel type may be used.

The control device 101 controls each of the plurality of first self-light-emitting pixels 103*a* and the plurality of second self-light-emitting pixels 103*b*. The control device 101 includes a state acquisition unit 111, a compensation parameter calculation unit 112, a memory 113, a compensation processing unit 114, and a display control unit 115. For example, the state acquisition unit 111, the compensation parameter calculation unit 112, the compensation processing unit 114, and the display control unit 115 may be implemented by a logic circuit formed in an application specific integrated circuit (ASIC), a field-programmable gate array (FPGA), or the like, or may be implemented by software using a processor such as a CPU. In the latter case, the processor such as the CPU reads and executes a program saved in the memory 113, thereby implementing the state acquisition unit 111, the compensation parameter calculation unit 112, the compensation processing unit 114, and the display control unit 115.

The state acquisition unit 111 acquires first state data 121*a* regarding the state of a first element included in the first self-light-emitting pixel 103*a* and second state data 121*b* regarding the state of a second element included in the second self-light-emitting pixel. Specifically, the state acquisition unit 111 acquires the first state data 121*a* by measuring the electrical characteristic of the first element, and acquires the second state data 121*b* by measuring the electrical characteristic of the second element. The first element includes a first self-light-emitting element L1*a* configured to emit first color light. The first state data 121*a* indicates the state of the first self-light-emitting element L1*a*. The second element includes a second self-light-emitting element L1*b* configured to emit second color light. The second state data 121*b* indicates the state of the second self-light-emitting element L1*b*. Note that in the following description, when the first self-light-emitting element L1*a* and the second self-light-emitting element L1*b* are not distinguished, they are called self-light-emitting element L1.

The state acquisition unit 111 includes a monitor control unit 116 and a monitor execution control unit 117.

The monitor control unit 116 measures a monitor value 122 indicating the electrical characteristic of an element included in the self-light-emitting pixel 103 based on a monitor input value 123.

For example, in a case where the monitor input value 123 indicates a voltage value to be applied to the element included in the self-light-emitting pixel 103, the monitor control unit 116 applies the element included in the self-light-emitting pixel 103 with the voltage of the voltage value indicated by the monitor input value 123, and measures, as the monitor value 122, a current value of a current flowing through the element.

Alternatively, in a case where the monitor input value 123 indicates a current value flowing through the element included in the self-light-emitting pixel 103, a current having the current value indicated by the monitor input value 123 is caused to flow through the element included in the self-light-emitting pixel 103, and the current value of the voltage generated in the element is measured as the monitor value 122.

The monitor execution control unit 117 acquires the monitor value 122 measured by the monitor control unit 116. Specifically, the monitor execution control unit 117 varies the monitor input value 123 in a predetermined range, inputs each monitor input value 123 to the monitor control unit 116, and acquires the monitor value 122 that is measured. The monitor execution control unit 117 acquires, as the first state data 121*a*, the monitor value 122 satisfying a target condition regarding the first self-light-emitting pixels 103*a*. Similarly, the monitor execution control unit 117 acquires, as the second state data 121*b*, the monitor value 122 satisfying a target condition regarding the second self-light-emitting pixels 103*b*.

The compensation parameter calculation unit 112 calculates a first compensation parameter 124*a* based on the first state data 121*a* and calculates a second compensation parameter 124*b* based on the second state data 121*b*.

The first compensation parameter 124*a* includes an L1IV compensation parameter 125*a* for correcting the current-voltage characteristic of the first self-light-emitting element L1*a*. A conversion model regarding the first self-light-emitting element L1*a* is determined by the L1IV compensation parameter 125*a*. For example, the conversion model regarding the first self-light-emitting element L1*a* indicates a conversion equation for compensating for a temporal change in the current-voltage characteristic regarding the first self-light-emitting element L1*a*.

The second compensation parameter 124*b* includes an L1IV compensation parameter 125*b* for correcting the current-voltage characteristic of the second self-light-emitting element L1*b*. A conversion model regarding the second self-light-emitting element L1*b* is determined by the L1IV compensation parameter 125*b*. For example, the conversion model regarding the second self-light-emitting element L1*b* indicates a conversion equation for compensating for a temporal change in the current-voltage characteristic regarding the second self-light-emitting element L1*b*. Note that when the L1IV compensation parameter 125*a* and the L1IV compensation parameter 125*b* are not distinguished, they are called L1IV compensation parameter 125.

Specifically, the compensation parameter calculation unit 112 determines the L1IV compensation parameter 125*a* based on the state of the first self-light-emitting element L1*a* indicated by the first state data 121*a*, and determines the L1IV compensation parameter 125*b* based on the state of the second self-light-emitting element L1*b* indicated by the second state data 121*b*.

Furthermore, the compensation parameter calculation unit 112 calculates a T2IV compensation parameter 126*a* for correcting the current-voltage characteristic of a first drive transistor T2*a*. The first drive transistor T2*a* is the drive transistor T2 included in the first self-light-emitting pixel 103*a*. A conversion model regarding the first drive transistor T2*a* is determined by the T2IV compensation parameter 126*a*. For example, the conversion model regarding the first drive transistor T2*a* indicates a conversion equation for compensating for a temporal change in the current-voltage characteristic regarding the first drive transistor T2*a*.

Furthermore, the compensation parameter calculation unit 112 calculates a T2IV compensation parameter 126*b* for correcting the current-voltage characteristic of a second drive transistor T2*b*. The second drive transistor T2*b* is the drive transistor T2 included in the second self-light-emitting pixel 103*b*. A conversion model regarding the second drive transistor T2*b* is determined by the T2IV compensation parameter 126*b*. For example, the conversion model regarding the second drive transistor T2*b* indicates a conversion equation for compensating for a temporal change in the current-voltage characteristic regarding the second drive transistor T2*b*. Note that when the T2IV compensation parameter 126*a* and the T2IV compensation parameter 126*b* are not distinguished, they are called T2IV compensation parameter 126.

The memory 113 is a storage module that stores information necessary for controlling the entire control device 101, and is a storage medium that stores data in a nonvolatile manner. For example, the memory 113 is a flash read only memory (ROM). The memory 113 saves the L1IV compensation parameter 125*a*, the L1IV compensation parameter 125*b*, the T2IV compensation parameter 126*a*, and the T2IV compensation parameter 126*b*. Furthermore, the memory 113 may save a program for causing each unit of the control device 101 to function.

The compensation processing unit 114 performs first compensation of compensating for a temporal change in the first self-light-emitting pixel 103*a* based on the first state data 121*a*. Specifically, the first compensation includes compensating for a temporal change in the current luminance characteristic of the first self-light-emitting element L1*a*. More specifically, the first compensation includes compensating for a temporal change in the current luminance characteristic of the first self-light-emitting element L1*a* based on the state of the first self-light-emitting element L1*a*.

Furthermore, the compensation processing unit 114 performs second compensation of compensating for a temporal change of the second self-light-emitting pixel 103*b* based on the first state data 121*a* and the second state data 121*b*. Specifically, the second compensation includes compensating for a temporal change in the current luminance characteristic of the second self-light-emitting element L1*b*. More specifically, the second compensation includes compensating for a temporal change in the current luminance characteristic of the second self-light-emitting element L1*b* based on the state of the first self-light-emitting element L1*a* and the state of the second self-light-emitting element L1*b*. In the second compensation, the first state data 121*a* indicates the state of the first element included in the first self-light-emitting pixel 103*a* that is at a predetermined position from the second self-light-emitting pixel 103*b*.

The display control unit 115 drives each self-light-emitting pixel 103 by supplying each self-light-emitting pixel 103 with a drive voltage to be determined from a gray scale value corrected by the first compensation or the second compensation, with each self-light-emitting pixel 103 of the plurality of self-light-emitting pixels 103 as the first self-light-emitting pixel 103*a* or the second self-light-emitting pixel 103*b*.

Figure 2:
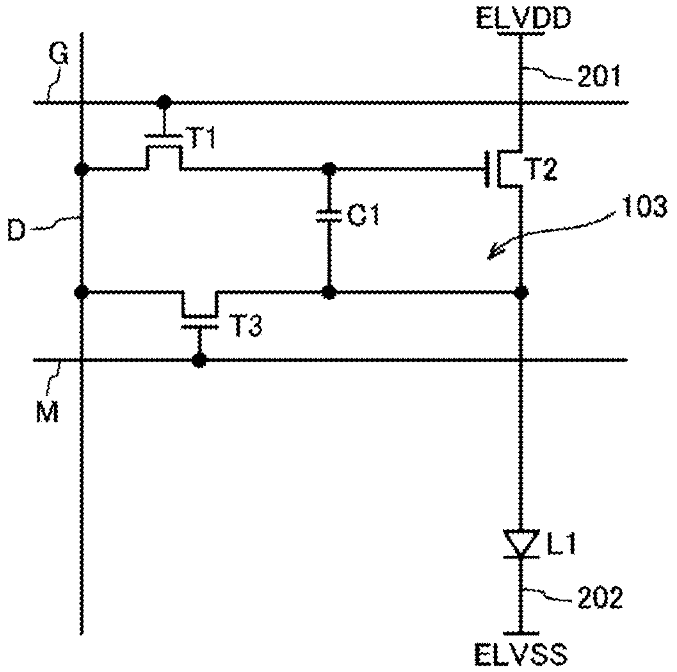
FIG. 2 is a view illustrating an example of a self-light-emitting pixel.

Next, an example of the self-light-emitting pixel 103 will be described with reference to FIG. 2. FIG. 2 is a view illustrating an example of the self-light-emitting pixel 103.

A first power supply line 201 and a second power supply line 202 are connected to the self-light-emitting pixel 103. The first power supply line 201 and the second power supply line 202 are connected to a power supply circuit (not illustrated). The first power supply line 201 is applied with a high-level power supply voltage ELVDD. The second power supply line 202 is applied with a low-level power supply voltage ELVSS. The power supply circuit is connected to a scanning line G, a measurement control line M, and a data line D. During normal image display, the data line D is a line for applying a voltage to a gate of the drive transistor T2.

A gate of the write control transistor T1 is connected to the scanning line G. A drain of the write control transistor T1 is connected to the data line D. A source of the write control transistor T1 is connected to one side terminal of a capacitor C1 and the gate of the drive transistor T2. The write control transistor T1 connects the data line D and the gate of the drive transistor T2 when in an on state. The scanning line G is connected to the gate of the write control transistor T1, and controls on and off of the write control transistor T1.

The drive transistor T2 controls a current flowing through the self-light-emitting element L1. A drain of the drive transistor T2 is connected to the first power supply line 201. A source of the drive transistor T2 is connected to the other side terminal of the capacitor C1 and the measurement transistor T3.

The measurement transistor T3 is switched between an on state and an off state based on the level of the measurement control line M. When the measurement transistor T3 is in the on state, a current flows through the drive transistor T2 or the self-light-emitting element L1, which is an element of a target for measuring the monitor value 122. A gate of the measurement transistor T3 is connected to the measurement control line M. One of the terminals other than the gate of the measurement transistor T3 is connected to the data line D. The other of the terminals other than the gate of the measurement transistor T3 is connected to an anode of the capacitor C1, the drive transistor T2, and the self-light-emitting element L1.

Next, the operation during image display will be described with reference to FIG. 2.

The display control unit 115 brings the scanning line G to an on level during image display. Furthermore, the display control unit 115 maintains the measurement control line M at an off level during image display. This makes the measurement transistor T3 maintained in the off state.

When the scanning line G is at the on level, the write control transistor T1 included in the self-light-emitting pixel 103 connected to the scanning line G is brought into the on state. This brings a gate potential of the drive transistor T2 close to a drive voltage value 128 applied to the data line D. As a result, the drive transistor T2 is brought into an on state. Due to this, a current flows toward the self-light-emitting element L1 via the drive transistor T2, and the self-light-emitting element L1 outputs light having luminance corresponding to the drive voltage value 128.

When a selection period of the scanning line G ends, the display control unit 115 changes the scanning line G to an off level. Due to this, in the self-light-emitting pixel 103, the write control transistor T1 is brought into an off state. In the self-light-emitting pixel 103, even when the write control transistor T1 is brought into the off state, the capacitor C1 holds a gate-source voltage of the drive transistor T2. Therefore, until the scanning line G becomes the on level again, the drive transistor T2 continues to cause a current corresponding to the voltage held by the capacitor C1 to flow through the self-light-emitting element L1. Due to this, the self-light-emitting element L1 continues to emit light until the scanning line G becomes the on level.

Next, a case where the monitor control unit 116 measures the monitor value 122 regarding the drive transistor T2 will be described. In the following description, the monitor value 122 indicates the current value of the current flowing through the drive transistor T2 applied with the voltage of the voltage value that is the monitor input value 123.

The monitor control unit 116 applies a voltage having a voltage value that is the monitor input value 123 to the data line D of the self-light-emitting pixel 103 of a measurement target. Subsequently, the monitor control unit 116 changes the level of the scanning line G of the self-light-emitting pixel 103 of the measurement target to the on level. Due to this, the write control transistor T1 of the self-light-emitting pixel 103 of the measurement target is turned on. As a result, the voltage having the voltage value that is the monitor input value 123 is applied to the capacitor C1. The one side terminal of the capacitor C1 rises, and the drive transistor T2 is turned on. Until this stage, the monitor control unit 116 maintains the measurement transistor T3 included in the self-light-emitting pixel 103 of the measurement target in the off state. When the drive transistor T2 is on, a current corresponding to a charge accumulated in the capacitor C1 starts to flow. When the application of the voltage having the voltage value that is the monitor input value 123 to the data line D of the self-light-emitting pixel 103 of the measurement target is stopped, the monitor control unit 116 causes the measurement transistor T3 included in the self-light-emitting pixel 103 of the measurement target to conduct. As a result, a current flows toward the monitor control unit 116 via the first power supply line 201, the drive transistor T2, the measurement transistor T3, and the data line D. In this case, the monitor control unit 116 measures, as the monitor value 122, the current value of the current flowing toward the monitor control unit 116.

Next, a case where the monitor control unit 116 measures the monitor value 122 regarding the self-light-emitting element L1 will be described.

The monitor control unit 116 applies the voltage having the voltage value that is the monitor input value 123 to the data line D of the self-light-emitting pixel 103 of the measurement target. On the other hand, the monitor control unit 116 maintains the scanning line G of the self-light-emitting pixel 103 of the measurement target at the off level. Due to this, the write control transistor T1 and the drive transistor T2 maintain the off state. The monitor control unit 116 causes the measurement transistor T3 to conduct. Due to this, the monitor control unit 116 causes a current to flow toward the self-light-emitting element L1 via the data line D and the measurement transistor T3. In this case, the monitor control unit 116 measures, as the monitor value 122, the current value of the current flowing through the self-light-emitting element L1.

Figure 3:
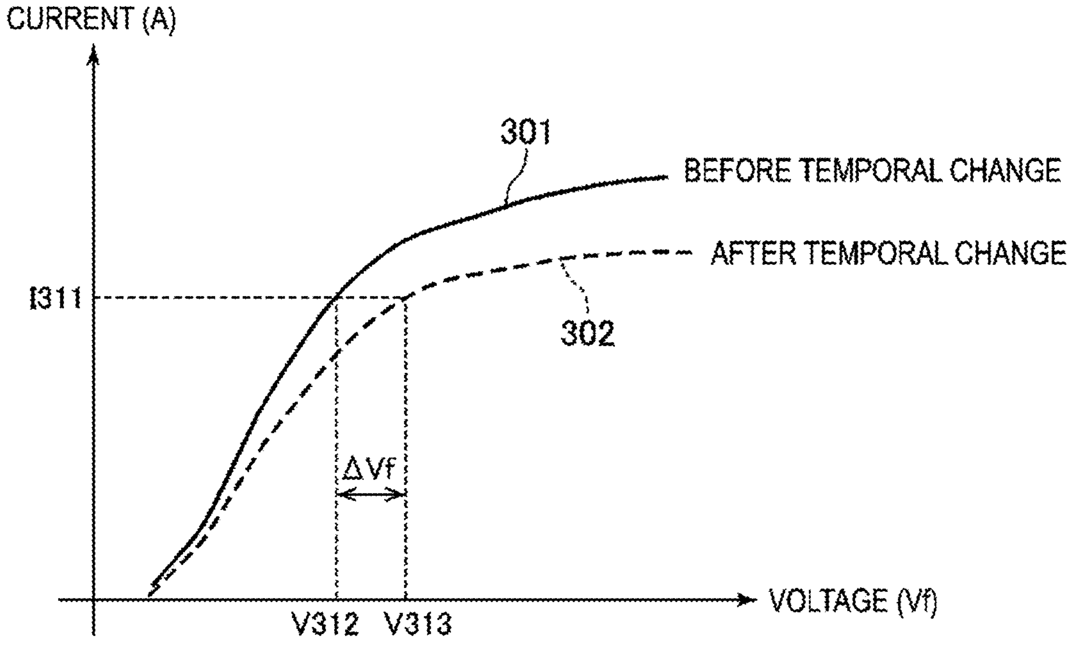
FIG. 3 is a view showing an example of a current-voltage characteristic before a temporal change and a current-voltage characteristic after the temporal change regarding the self-light-emitting element.

FIG. 3 is a view showing a graph 301 showing an example of the current-voltage characteristic before a temporal change and a graph 302 showing an example of the current-voltage characteristic after the temporal change regarding the self-light-emitting element L1. In FIG. 3, the horizontal axis represents the voltage, and the vertical axis represents the current. As shown in FIG. 3, after the temporal change, when a voltage having the same voltage value as that before the temporal change is applied to the self-light-emitting element L1, the current is less likely to flow than before the temporal change.

For example, before the temporal change, as shown in the graph 301, in order to cause the current having a current value I311 to flow through the self-light-emitting element L1, it is necessary to apply the voltage having a voltage value V312 to the self-light-emitting element L1. On the other hand, after the temporal change, since the electrical characteristic of the element included in the self-light-emitting pixel 103 changes, as shown in the graph 302, in order to cause the current having the current value I311 to flow through the self-light-emitting element L1, it is necessary to apply the voltage having a voltage value V313 higher than the voltage value V312. That is, after the temporal change, in order to cause a current having the same current value as that before the temporal change to flow through the self-light-emitting element L1, it is necessary to apply a voltage having a voltage value higher than that before the temporal change. In the following description, a difference between the voltage value before a temporal change and the voltage value after the temporal change, which is necessary for causing the current having the same current value to flow through the self-light-emitting element L1, is called a voltage shift amount ΔVf.

Figure 4:
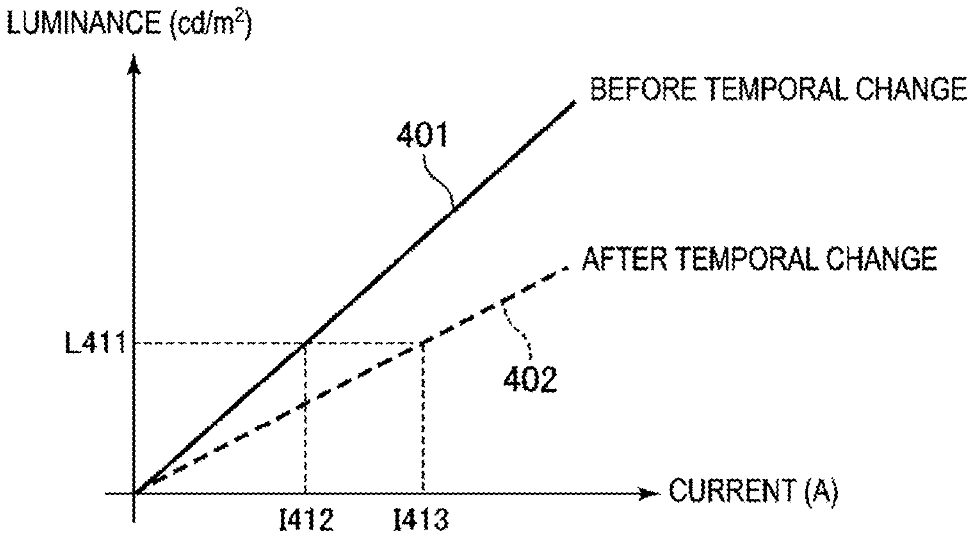
FIG. 4 is a view showing an example of a current luminance characteristic before a temporal change and an example of a current luminance characteristic after the temporal change regarding the self-light-emitting element.

FIG. 4 is a view showing a graph 401 showing an example of the current luminance characteristic before a temporal change and a graph 402 showing an example of the current luminance characteristic after the temporal change regarding the self-light-emitting element L1. In FIG. 4, the horizontal axis represents the current, and the vertical axis represents the luminance. After the temporal change, when a current having the same current value as that before the temporal change is caused to flow through the self-light-emitting element L1, the luminance decreases. This is considered to be because the luminous efficiency of the self-light-emitting element L1 decreases due to the temporal change.

For example, before the temporal change, as shown in the graph 401, in order to emit light having a luminance L411 from the self-light-emitting element L1, it is necessary to flow a current having a current value 412 through the self-light-emitting element L1. On the other hand, after the temporal change, since the characteristic of the self-light-emitting element L1 changes, as shown in the graph 402, in order to emit light having the luminance L411 from the self-light-emitting element L1, it is necessary to flow a current having a current value I413 larger than the current value I412 through the self-light-emitting element L1. Therefore, after the temporal change, in order to compensate for the temporal change in the luminous efficiency so that light having the same luminance as that before the temporal change is emitted from the self-light-emitting element L1, it is necessary to flow a current having a current value higher than that before the temporal change. In the following description, an increase ratio from the current value before a temporal change to the current value after the temporal change, which is necessary for light having the same luminance to be output from the self-light-emitting element L1, is called a luminous efficiency compensation ratio.

As described above, after the temporal change, in order to output light having the same luminance as that before the temporal change from the self-light-emitting element L1, the control device 101 needs to compensating for the temporal change in the current luminance characteristic and the temporal change in the current-voltage characteristic and apply a voltage to the self-light-emitting pixel 103. Therefore, the control device 101 needs to grasp the luminous efficiency compensation ratio and the voltage shift amount ΔVf in association with each other.

Figure 5:
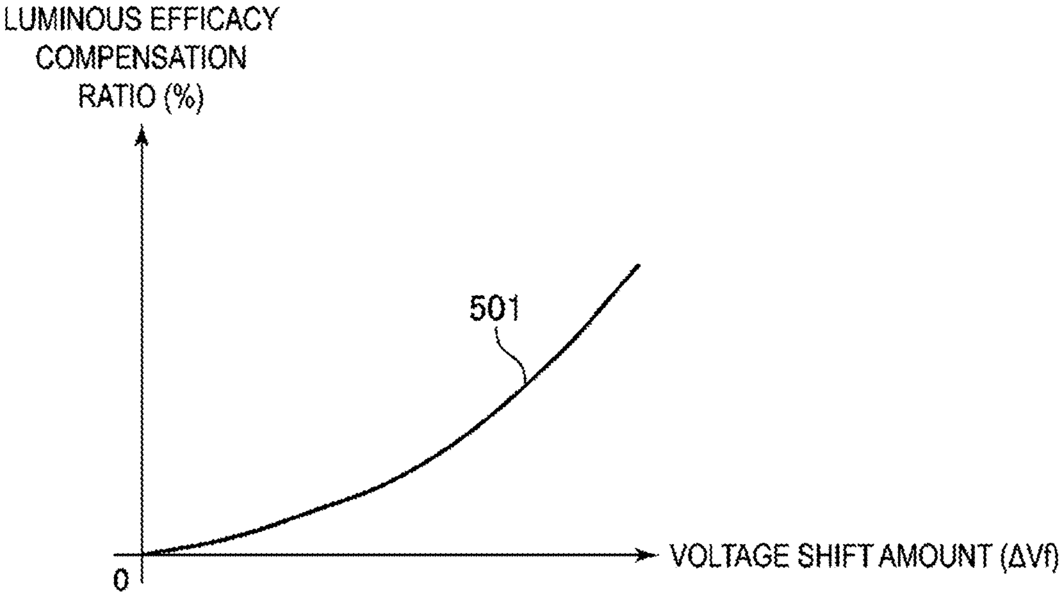
FIG. 5 is a view showing an example of a relationship between a voltage shift amount and a luminous efficiency compensation ratio.

FIG. 5 is a view showing an example of the relationship between the voltage shift amount ΔVf and the luminous efficiency compensation ratio. In FIG. 5, the horizontal axis represents the voltage shift amount, and the vertical axis represents the luminous efficiency compensation ratio. As shown in a graph 501, when the voltage shift amount ΔVf is zero, the luminous efficiency compensation ratio is zero. However, as shown in the graph 501, the luminous efficiency compensation ratio increases with an increase in the voltage shift amount ΔVf.

Since the characteristic of the self-light-emitting pixel 103 changes due to a temporal change, the compensation parameter calculation unit 112 determines the L1IV compensation parameter 125 and the T2IV compensation parameter 126 so that the luminance of the self-light-emitting element L1 becomes the same with respect to the gray scale value having the same value before the temporal change and after the temporal change of the element included in the self-light-emitting pixel 103. The gray scale value indicates the luminance of the self-light-emitting element L1 included in each self-light-emitting pixel 103, and is indicated by an input image.

Figure 6A:
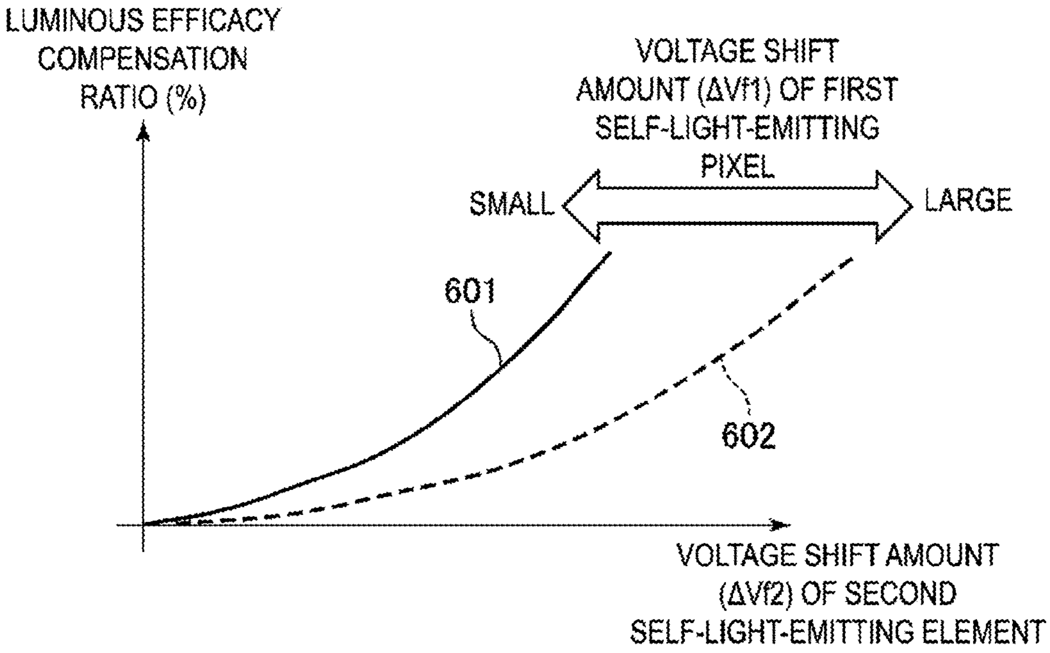
FIG. 6A shows an example of a current luminance characteristic between a voltage shift amount regarding a state of a second self-light-emitting element and a luminous efficiency compensation ratio, in accordance with a voltage shift amount of a first self-light-emitting element.

FIG. 6A shows an example of the relationship between a voltage shift amount ΔVf2 regarding the state of the second self-light-emitting element L1*b* and the luminous efficiency compensation ratio, in accordance with a voltage shift amount ΔVf1 regarding the state of the first self-light-emitting element L1*a*. In FIG. 6A, the horizontal axis represents the voltage shift amount regarding the state of the second self-light-emitting element L1*b*, and the vertical axis represents the luminous efficiency compensation ratio. A graph 601 and a graph 602 show the characteristic of the second self-light-emitting element L1*b* in a case where the voltage shift amount ΔVf1 regarding the state of the first self-light-emitting element L1*a* included in the first self-light-emitting pixel 103*a* that is at a predetermined position from the second self-light-emitting pixel 103*b* including the second self-light-emitting element L1*b* is relatively small and in a case where that is large. The inventors of the disclosure have thus found that the characteristic of the second self-light-emitting element L1*b* is relevant to the state of the first self-light-emitting element L1*a* included in the first self-light-emitting pixel 103*a* that is at a predetermined position from the second self-light-emitting pixel 103*b* including the second self-light-emitting element L1*b*. This will be described later with reference to FIGS. 11 to 13. The "predetermined position" will be described later with reference to FIG. 33.

For example, it is assumed that the memory 113 saves a reference table LUT indicating the current luminance characteristic shown by the graph 601 and the graph 602. The graph 601 and the graph 602 show an example of the current luminance characteristic of the voltage shift amount ΔVf2 regarding the state of the second self-light-emitting element L1*b* and the luminous efficiency compensation ratio, regarding the voltage shift amount ΔVf1 different from each other regarding the state of the first self-light-emitting element L1*a*.

The compensation processing unit 114 calculates the luminous efficiency compensation ratio regarding the second self-light-emitting pixel 103*b* by linearly interpolating the current luminance characteristic shown by the graph 601 and the current luminance characteristic shown by the graph 602 based on the first compensation parameter 124*a* and the second compensation parameter 124*b*.

Alternatively, as shown in Expression (1), the compensation processing unit 114 may calculate a luminous efficiency compensation ratio LR regarding the second self-light-emitting pixel 103*b* by multiplying the first compensation parameter 124*a* corresponding to the state of the first self-light-emitting pixel 103*a* by a coefficient k corresponding to the voltage shift amount ΔVf1 regarding the state of the second self-light-emitting element L1*b*, using one piece of LUT data corresponding to the voltage shift amount ΔVf2 regarding the second self-light-emitting element L1*b*.

[Expression 1]

$$LR = LUT(\Delta Vf2 \times k(\Delta vf1)) \quad (1)$$

Figure 6B:
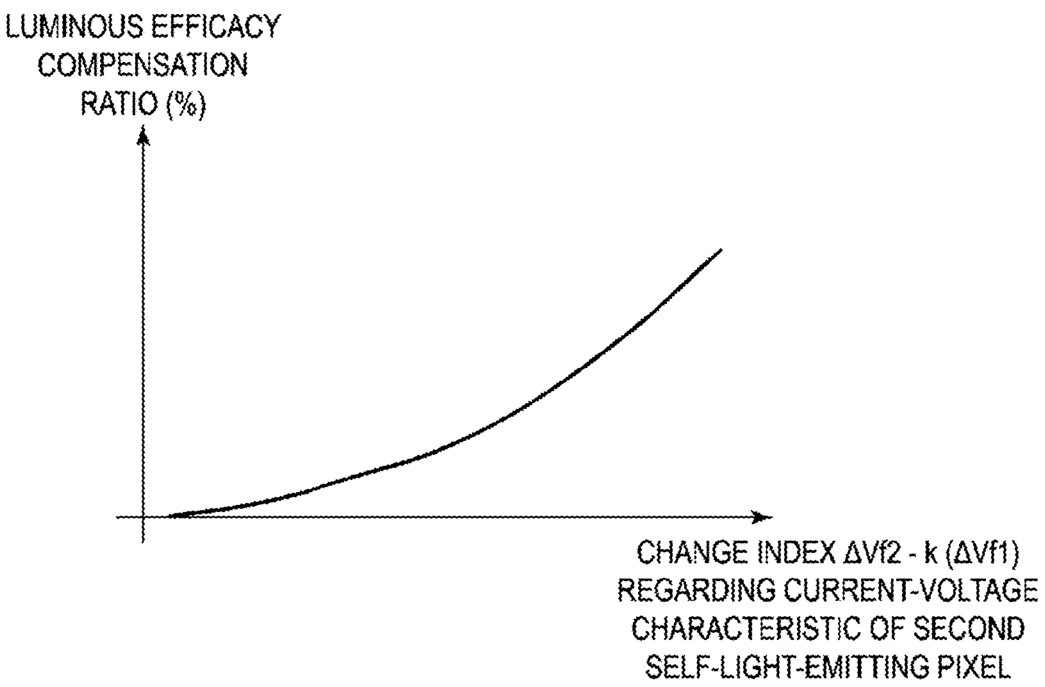
FIG. 6B is a view showing an example of a relationship between a change index of a current-voltage characteristic of the second self-light-emitting pixel and the luminous efficiency compensation ratio.

FIG. 6B shows an example of the relationship between a change index of the current-voltage characteristic of the second self-light-emitting pixel 103*b* and the luminous efficiency compensation ratio. In FIG. 6B, the horizontal axis represents the change index of the current-voltage characteristic regarding the second self-light-emitting pixel 103*b*, and the vertical axis represents the luminous efficiency compensation ratio. The change index of the current-voltage characteristic regarding the second self-light-emitting pixel 103*b* is a value obtained by subtracting a value obtained by multiplying the voltage shift amount ΔVf1 regarding the state of the first self-light-emitting element L1*a* by a coefficient corresponding to the state of the first self-light-emitting pixel 103*a* from the voltage shift amount ΔVf2 regarding the state of the second self-light-emitting element L1*b*.

As shown in Expression (2), the compensation processing unit 114 may calculate the luminous efficiency compensation ratio LR regarding the second self-light-emitting pixel 103*b* using one piece of LUT data corresponding to the change index of the current-voltage characteristic regarding the second self-light-emitting pixel 103*b*.

[Expression 2]

$$LR = LUT(\Delta Vf2 - k(\Delta Vf1)) \quad (2)$$

Figure 7:
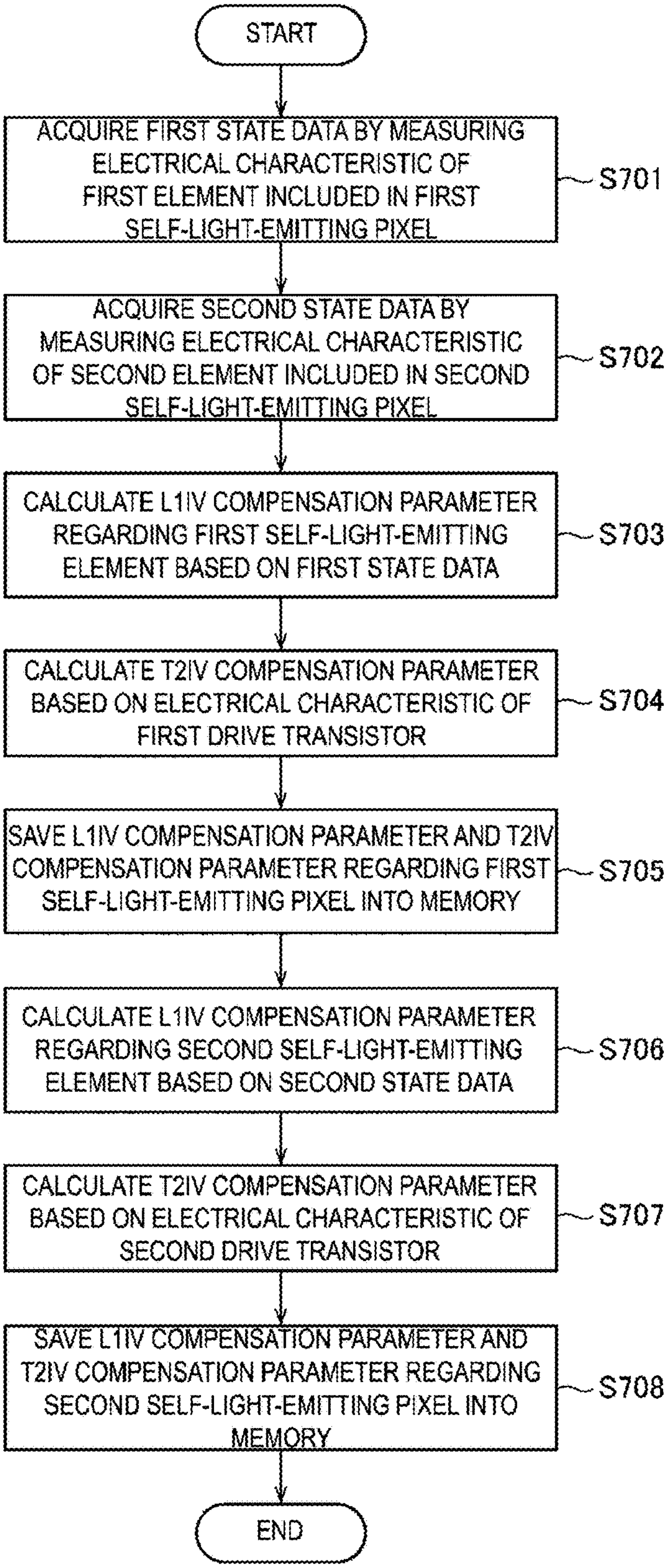
FIG. 7 is a flowchart showing an example of operation of a control device according to a first embodiment.

Next, processing of calculating the first compensation parameter 124*a* of the first self-light-emitting pixel 103*a* of the measurement target and the second compensation parameter 124*b* of the second self-light-emitting pixel 103*b* of the measurement target will be described with reference to FIG. 7. FIG. 7 is a flowchart showing an example of the operation of the control device 101 according to the present embodiment. In the description regarding FIG. 7, the first self-light-emitting element L1*a* and the first drive transistor T2*a* are the self-light-emitting element L1 and the drive transistor T2 included in the first self-light-emitting pixel 103*a* of the measurement target. In the description regarding FIG. 7, the second self-light-emitting element L1*b* and the second drive transistor T2*b* are the self-light-emitting element L1 and the drive transistor T2 included in the second self-light-emitting pixel 103*b* of the measurement target.

In step S701, the state acquisition unit 111 acquires the first state data 121*a* by measuring the electrical characteristic of the first element included in the first self-light-emitting pixel 103*a*. In the present embodiment, the first element includes the first self-light-emitting element L1*a*. Specifically, the state acquisition unit 111 acquires the first state data 121*a* by measuring the electrical characteristic of the first self-light-emitting element L1*a*. In step S701, the state acquisition unit 111 measures the electrical characteristic of the first drive transistor T2*a*.

In step S702, the state acquisition unit 111 acquires the second state data 121*b* by measuring the electrical characteristic of the second element included in the second self-light-emitting pixel 103*b*. In the present embodiment, the second element includes the second self-light-emitting element L1*b*. Specifically, the state acquisition unit 111 acquires the second state data 121*b* by measuring the electrical characteristic of the second self-light-emitting element L1*b*. In step S702, the state acquisition unit 111 measures the electrical characteristic of the second drive transistor T2*b*.

In step S703, the compensation parameter calculation unit 112 calculates the first compensation parameter 124*a* including the L1IV compensation parameter 125*a* regarding the first self-light-emitting element L1*a* based on the first state data 121*a*.

In step S704, the compensation parameter calculation unit 112 calculates the T2IV compensation parameter 126*a* regarding the first drive transistor T2*a* based on the electrical characteristic of the first drive transistor T2*a*.

In step S705, the compensation parameter calculation unit 112 saves the L1IV compensation parameter 125*a* calculated in step S703 and the T2IV compensation parameter 126*a* calculated in step S704 into the memory 113 in association with identification information of the first self-light-emitting pixel 103*a* of the measurement target. For example, the identification information of the first self-light-emitting pixel 103*a* is a set of a row number and a column number of the first self-light-emitting pixel 103*a*.

In step S706, the compensation parameter calculation unit 112 calculates the second compensation parameter 124*b* including the L1IV compensation parameter 125*b* regarding the second self-light-emitting element L1*b* based on the second state data 121*b*.

In step S707, the compensation parameter calculation unit 112 calculates the T2IV compensation parameter 126*b* regarding the second drive transistor T2*b* based on the electrical characteristic of the second drive transistor T2*b*.

In step S708, the compensation parameter calculation unit 112 saves the L1IV compensation parameter 125*b* calculated in step S706 and the T2IV compensation parameter 126*b* calculated in step S707 into the memory 113 in association with identification information of the second self-light-emitting pixel 103*b* of the measurement target. For example, the identification information of the second self-light-emitting pixel 103*b* is a set of a row number and a column number of the second self-light-emitting pixel 103*b*.

Figure 8:
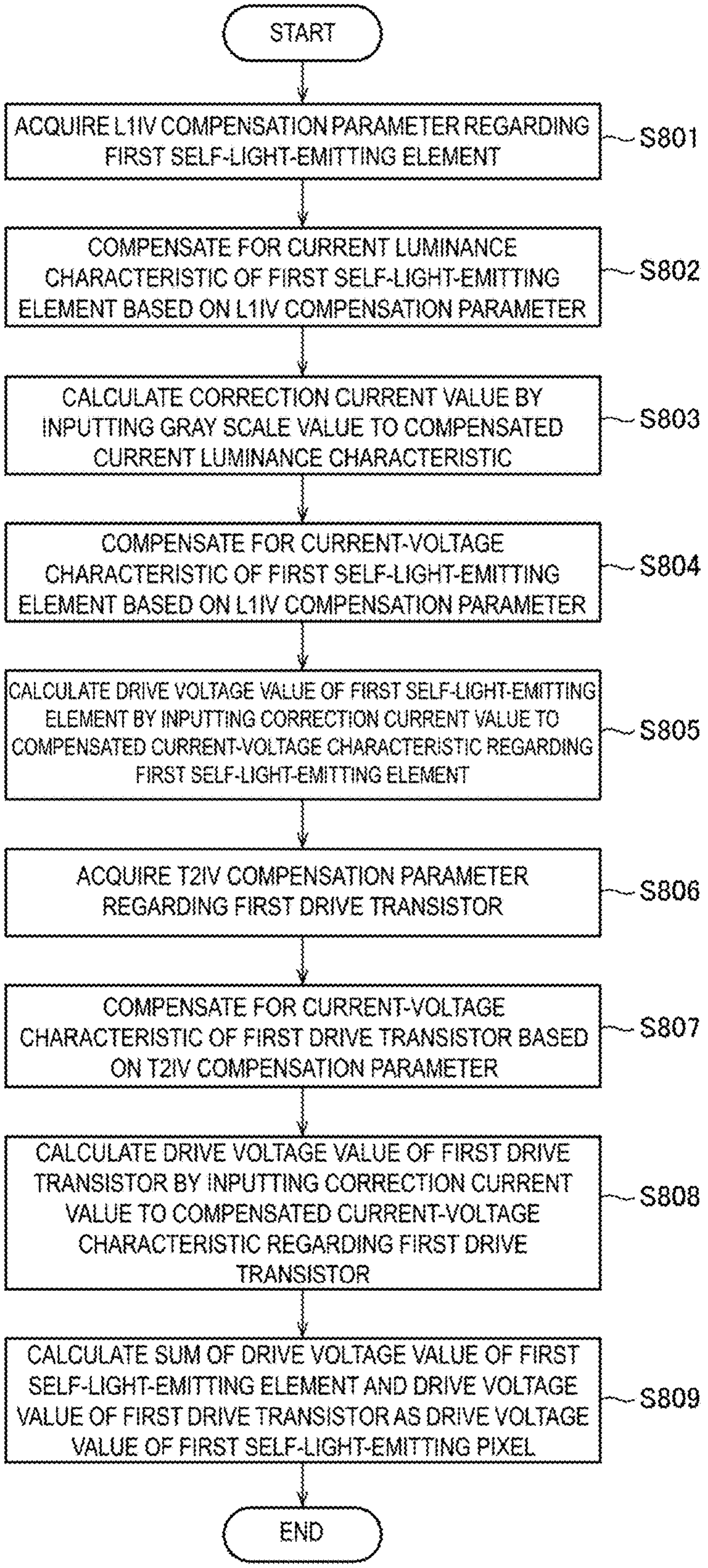
FIG. 8 is a flowchart showing an example of first compensation in the control device according to the first embodiment.

Next, the first compensation regarding the first self-light-emitting pixel 103*a* of a compensation target will be described with reference to FIG. 8. FIG. 8 is a flowchart showing an example of the first compensation in the control device 101 according to the present embodiment. In the description regarding FIG. 8, the first self-light-emitting element L1*a* and the first drive transistor T2*a* are the self-light-emitting element L1 and the drive transistor T2 included in the first self-light-emitting pixel 103*a* of the compensation target.

In step S801, the compensation processing unit 114 acquires the L1IV compensation parameter 125*a* regarding the first self-light-emitting element L1*a* from the memory 113.

In step S802, the compensation processing unit 114 compensates, as the first compensation, the current luminance characteristic of the first self-light-emitting element L1*a* based on the L1IV compensation parameter 125*a*.

In step S803, the compensation processing unit 114 calculates a correction current value of the first self-light-emitting element L1*a* by inputting the gray scale value regarding the first self-light-emitting pixel 103*a* of the compensation target to the current luminance characteristic compensated in step S802.

In step S804, the compensation processing unit 114 compensates the current-voltage characteristic of the first self-light-emitting element L1*a* based on the L1IV compensation parameter 125*a*.

In step S805, the compensation processing unit 114 calculates the voltage value of the voltage of the first self-light-emitting element L1*a* by inputting the correction current value calculated in step S803 to the current-voltage characteristic compensated in step S804 regarding the first self-light-emitting element L1*a*.

In step S806, the compensation processing unit 114 acquires the T2IV compensation parameter 126*a* regarding the first drive transistor T2*a* from the memory 113.

In step S807, the compensation processing unit 114 compensates the current-voltage characteristic of the first drive transistor T2*a* based on the T2IV compensation parameter 126*a*.

In step S808, the compensation processing unit 114 calculates the voltage value of the voltage of the first drive transistor T2*a* by inputting the correction current value calculated in step S803 to the current-voltage characteristic compensated in step S807 regarding the first drive transistor T2*a*.

In step S809, the compensation processing unit 114 calculates, as a drive voltage value 128*a* of the first self-light-emitting pixel 103*a*, the sum of the voltage value of the voltage of the first self-light-emitting element L1*a* calculated in step S805 and the voltage value of the voltage of the first drive transistor T2*a* calculated in step S808. Note that in the present description, there is a case where "drive voltage value 128" is described with a character such as "a" in this manner.

Figure 9:
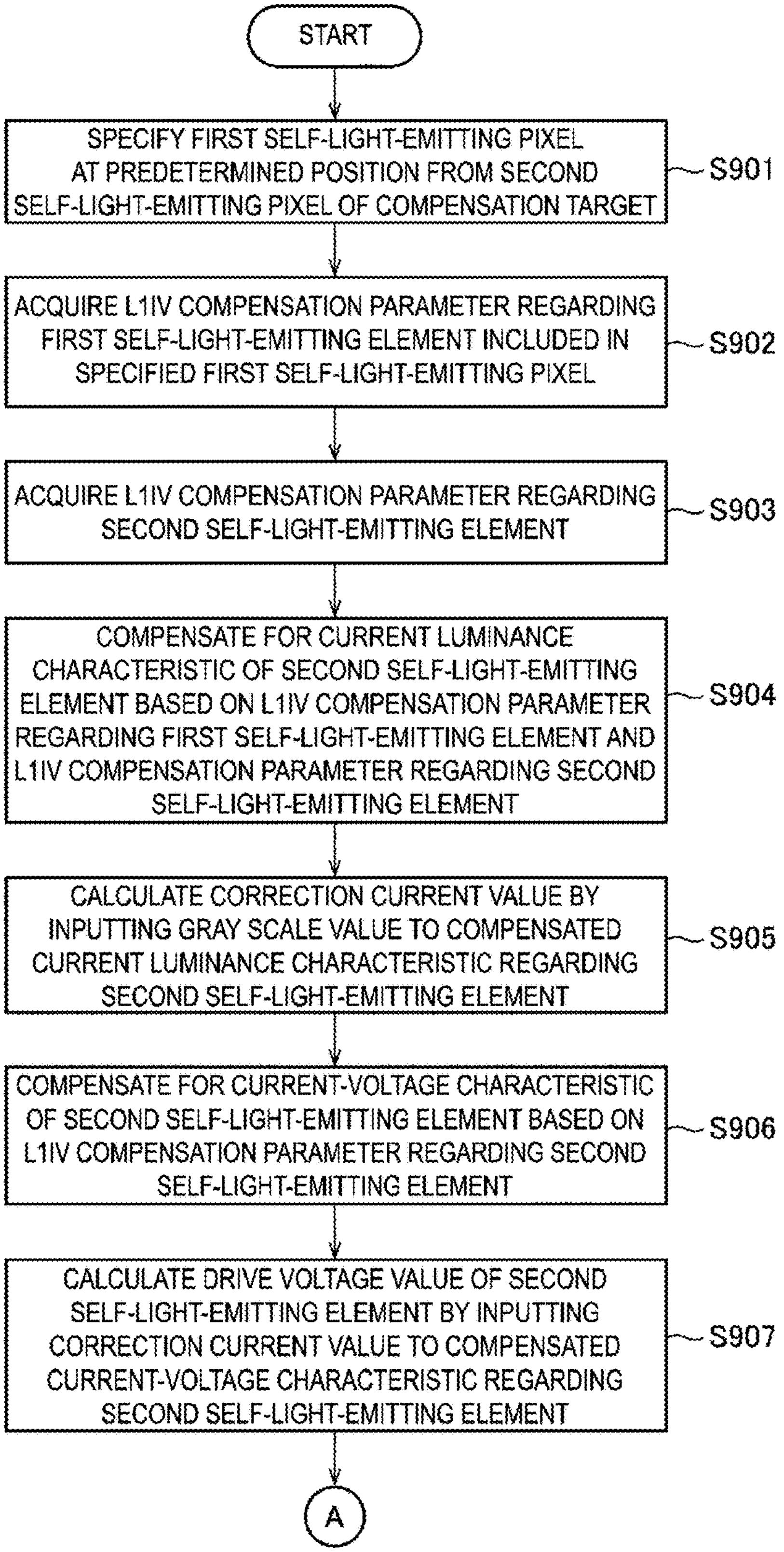
FIG. 9 is a flowchart showing an example of second compensation in the control device according to the first embodiment.

Next, the second compensation regarding the second self-light-emitting pixel 103*b* of a compensation target will be described with reference to FIG. 9. FIG. 9 is a flowchart showing an example of the second compensation in the control device 101 according to the present embodiment. In the description regarding FIG. 9, the first self-light-emitting element L1*a* and the first drive transistor T2*a* are the self-light-emitting element L1 and the drive transistor T2 included in the first self-light-emitting pixel 103*a* that is at a predetermined position from the second self-light-emitting pixel 103*b* of the compensation target. In the description regarding FIG. 9, the second self-light-emitting element L1*b* and the second drive transistor T2*b* are the self-light-emitting element L1 and the drive transistor T2 included in the second self-light-emitting pixel 103*b* of the compensation target.

In step S901, the compensation processing unit 114 specifies the first self-light-emitting pixel 103*a* at a predetermined position from the second self-light-emitting pixel 103*b* of the compensation target. For example, the compensation processing unit 114 specifies the first self-light-emitting pixel 103*a* adjacent to the second self-light-emitting pixel 103*b* of the compensation target.

In step S902, the compensation processing unit 114 acquires, from the memory 113, the L1IV compensation parameter 125*a* regarding the first self-light-emitting element L1*a* included in the first self-light-emitting pixel 103*a* specified in step S901.

In step S903, the compensation processing unit 114 acquires an L1IV compensation parameter 125*b* regarding the second self-light-emitting element L1*b* from the memory 113.

In step S904, the compensation processing unit 114 compensates for a temporal change in the current luminance characteristic of the second self-light-emitting element L1*b* based on the L1IV compensation parameter 125*a* regarding the first self-light-emitting element L1*a* and the L1IV compensation parameter 125*b* regarding the second self-light-emitting element L1*b*.

In step S905, the compensation processing unit 114 calculates a correction current value of the second self-light-emitting element L1*b* by inputting the gray scale value regarding the second self-light-emitting pixel 103*b* of the compensation target to the current luminance characteristic compensated in step S904, regarding the second self-light-emitting element L1*b*.

In step S906, the compensation processing unit 114 compensates the current-voltage characteristic of the second self-light-emitting element L1*b* based on the L1IV compensation parameter 125*b* regarding the second self-light-emitting element L1*b*.

In step S907, the compensation processing unit 114 calculates the voltage value of the voltage of the second self-light-emitting element L1*b* by inputting the correction current value calculated in step S905 to the current-voltage characteristic compensated in step S906 regarding the second self-light-emitting element L1*b*. Then, the compensation processing unit 114 transitions the process to step S1001 shown in FIG. 10.

Figure 10:
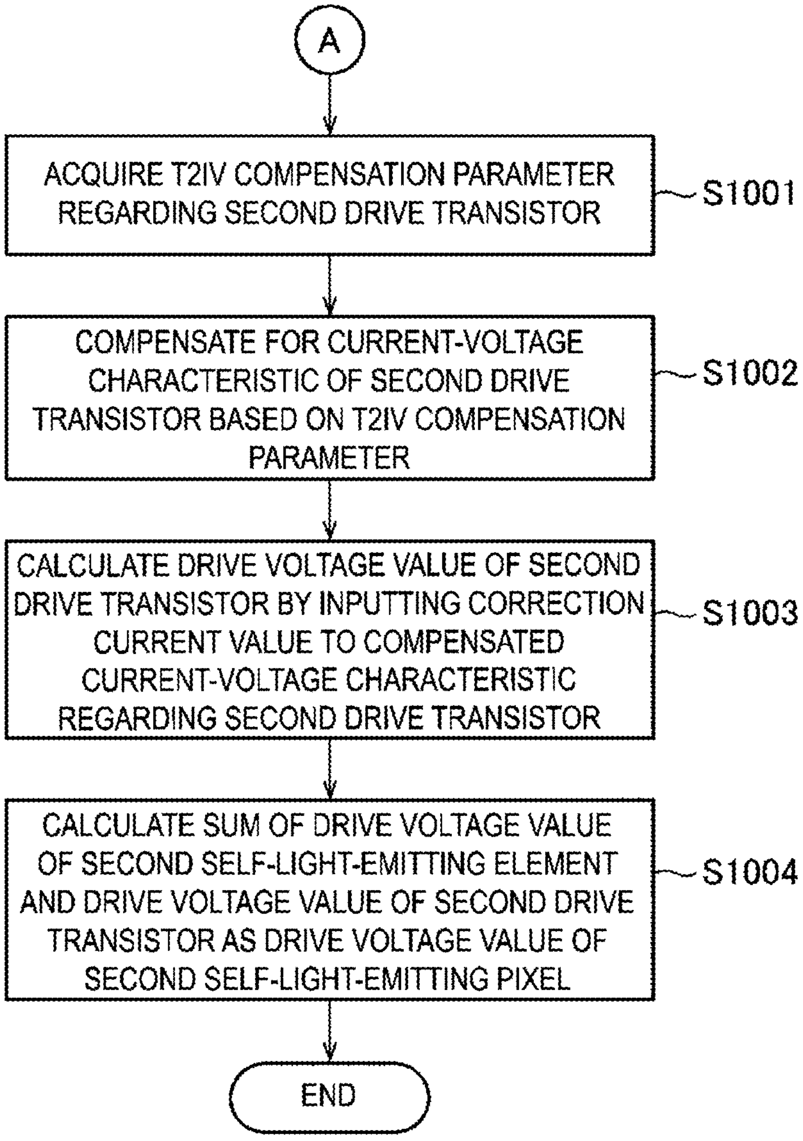
FIG. 10 is a flowchart showing an example of second compensation in the control device according to the first embodiment subsequent to FIG. 9.

Next, the second compensation regarding the second self-light-emitting pixel 103*b* of the compensation target will be continuously described with reference to FIG. 10.

In step S1001, the compensation processing unit 114 acquires the T2IV compensation parameter 126*b* regarding the second drive transistor T2*b* from the memory 113.

In step S1002, the compensation processing unit 114 compensates the current-voltage characteristic of the first drive transistor T2*a* based on the T2IV compensation parameter 126*b*.

In step S1003, the compensation processing unit 114 calculates the voltage value of the voltage of the second drive transistor T2*b* by inputting the correction current value calculated in step S905 shown in FIG. 9 to the current-voltage characteristic compensated in step S1002 regarding the second drive transistor T2*b*.

In step S1004, the compensation processing unit 114 calculates, as a drive voltage value 128*b* of the second self-light-emitting pixel 103*b*, the sum of the voltage value calculated in step S907 shown in FIG. 9 and the voltage value calculated in step S1003.

Figure 11:
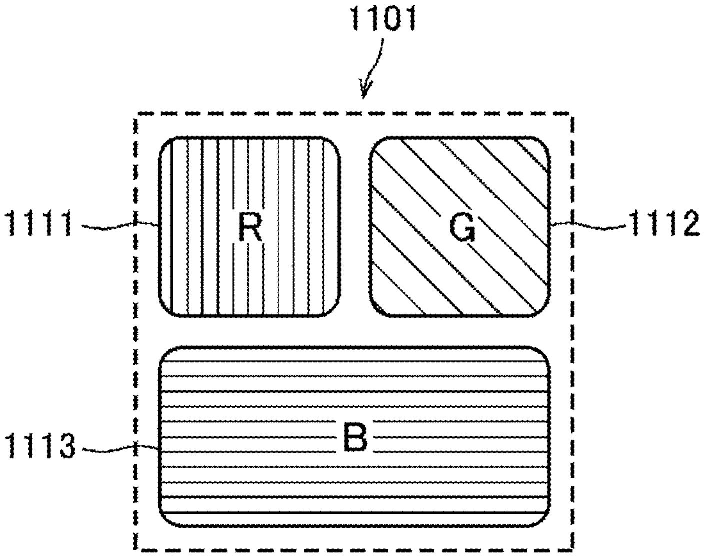
FIG. 11 is a view illustrating an example of arrangement of subpixels constituting a pixel.

FIG. 11 is a view illustrating an example of arrangement of a subpixel 1111 to a subpixel 1113 constituting a pixel 1101. The subpixel 1111 is a red subpixel that is the second self-light-emitting pixel 103*b*. The second self-light-emitting element L1*b* included in the subpixel 1111 emits red light. The subpixel 1112 is a green subpixel that is the second self-light-emitting pixel 103*b*. The second self-light-emitting element L1*b* included in the subpixel 1112 emits green light. The subpixel 1113 is a blue subpixel that is the first self-light-emitting pixel 103*a*. The second self-light-emitting element L1*b* included in the subpixel 1113 emits blue light. In the following description, a case where the first color light is blue light and the second color light is red light and green light will be described as an example.

Figure 12:
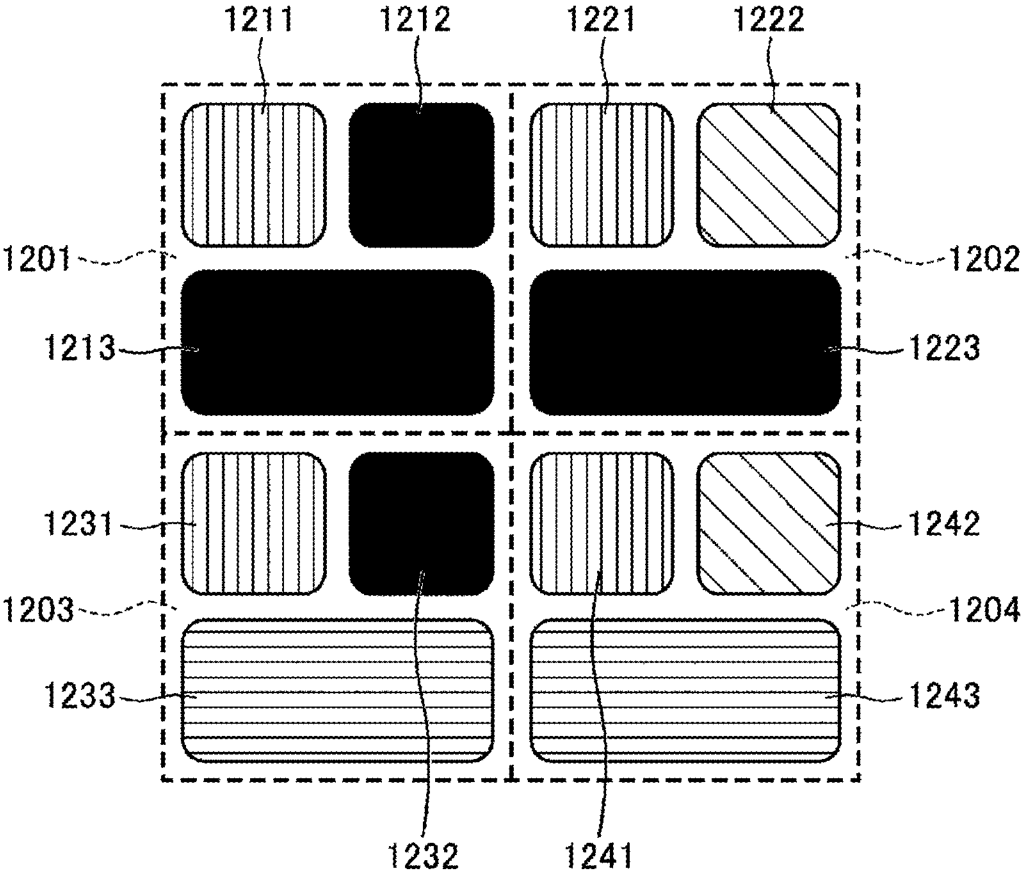
FIG. 12 is a view illustrating an example of a pixel.

FIG. 12 is a view illustrating an example of a pixel 1201 to a pixel 1204.

The pixel 1201 is in a state where a red subpixel 1211 that is the second self-light-emitting pixel 103*b* emits red light, and in a state where a green subpixel 1212 that is the second self-light-emitting pixel 103*b* and a blue subpixel 1213 that is the first self-light-emitting pixel 103*a* do not emit light. Therefore, red light is visually recognized regarding the pixel 1201.

The pixel 1202 is in a state where a red subpixel 1221 that is the second self-light-emitting pixel 103*b* emits light and a green subpixel 1222 that is the second self-light-emitting pixel 103*b* emits light at the same gray scale value as that of the subpixel 1211, and in a state where a blue subpixel 1223 that is the first self-light-emitting pixel 103*a* does not emit light. Therefore, yellow light is visually recognized regarding the pixel 1202.

The pixel 1203 is in a state where a red subpixel 1231 that is the second self-light-emitting pixel 103*b* emits light and a blue subpixel 1232 that is the first self-light-emitting pixel 103*a* emits light at the same gray scale value as that of the subpixel 1211, and in a state where a green subpixel 1233 that is the second self-light-emitting pixel 103*b* does not emit light. Therefore, magenta light is visually recognized regarding the pixel 1203.

The pixel 1204 is in a state where a red subpixel 1241 that is the second self-light-emitting pixel 103*b*, a green subpixel 1242 that is the second self-light-emitting pixel 103*b*, and a blue subpixel 1243 that is the first self-light-emitting pixel 103*a* emit light at the same gray scale value as that of the subpixel 1211. Therefore, white light is visually recognized regarding the pixel 1204.

In a case where the self-light-emitting elements L1 included in the red subpixel 1211, the red subpixel 1221, the red subpixel 1231, and the red subpixel 1241 emit light having the same luminance, the self-light-emitting elements L1 included in the red subpixel 1211, the red subpixel 1221, the red subpixel 1231, and the red subpixel 1241 were considered to cause the same deterioration after a temporal change, and considered to have the same luminous efficiency compensation ratios as one another in order to output light having the same luminance as that before the temporal change. However, the inventors of the disclosure have found that there is a case where the luminous efficiency compensation ratios are different after a temporal change regarding the second self-light-emitting elements L1*b* included in the red subpixel 1211, the red subpixel 1221, the red subpixel 1231, and the red subpixel 1241.

Figure 13:
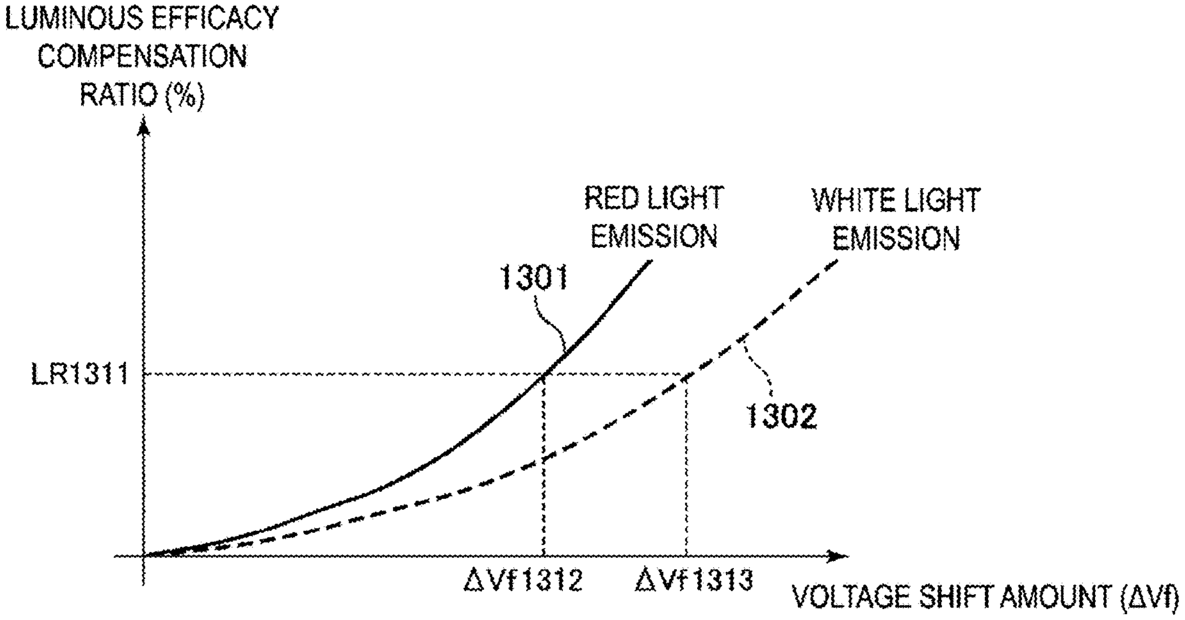
FIG. 13 shows an example of a relationship between a voltage shift amount and a luminous efficiency compensation ratio regarding a pixel in which light of different colors is visually recognized.

FIG. 13 shows an example of the relationship between the voltage shift amount ΔVf and the luminous efficiency compensation ratio regarding a pixel in which light of different colors is visually recognized.

A graph 1301 shows an example of the relationship between the voltage shift amount ΔVf of the red subpixel 1211 and the luminous efficiency compensation ratio, regarding the pixel 1201 illustrated in FIG. 12. That is, the graph 1301 shows an example of the relationship between the voltage shift amount ΔVf of the red subpixel 1211 and the luminous efficiency compensation ratio, regarding the pixel in which the red light is visually recognized. A graph 1302 shows an example of the relationship between the voltage shift amount ΔVf of the red subpixel 1241 and the luminous efficiency compensation ratio, regarding the pixel 1204 illustrated in FIG. 12. That is, the graph 1302 shows an example of the relationship between the voltage shift amount ΔVf of the red subpixel 1241 and the luminous efficiency compensation ratio, regarding the pixel in which the white light is visually recognized.

As shown in the graph 1301, regarding the pixel in which red light is visually recognized, when the luminous efficiency compensation ratio of the red subpixel 1211 has a value LR1311, the voltage shift amount ΔVf has a value ΔVf1312. On the other hand, as shown in the graph 1302, regarding the pixel in which white light is visually recognized, when the luminous efficiency compensation ratio of the red subpixel 1241 has the value LR1311, the voltage shift amount ΔVf has a value ΔVf1313 larger than the value ΔVf1312. Although not illustrated, a phenomenon similar to that of the red subpixel was also observed in the green subpixel. This indicates that light emission of the blue subpixel promotes a decrease in the luminous efficiency of the red subpixel and the green subpixel configured to emit light having a longer wavelength. In other words, it is found that the characteristic of the second self-light-emitting element L1*b* is relevant to the state of the first self-light-emitting pixel 103*a* that is at a predetermined position from the second self-light-emitting pixel 103*b* including the second self-light-emitting element L1*b*.

As a cause of this phenomenon, a possibility is conceivable in which a leakage current of the first self-light-emitting pixel 103*a* and a temperature rise of the first self-light-emitting pixel 103*a* due to light emission of the first self-light-emitting pixel 103*a* affect the second self-light-emitting pixel 103*b* around the first self-light-emitting pixel 103*a*, thereby affecting the temporal change in the current luminance characteristic of the second self-light-emitting pixel 103*b*. As a cause of this phenomenon, a possibility is conceivable in which the first color light output from the first self-light-emitting pixel 103*a* affects the temporal change in the current luminance characteristic of the second self-light-emitting pixel 103*b* around the first self-light-emitting pixel 103*a*.

In consideration of this phenomenon, it is desirable that the compensation processing regarding the red subpixel and the green subpixel is added with not only its own deterioration but also the influence of light emission of the blue subpixel that is at a predetermined position from its own. Here, if the blue subpixel emits light, deterioration of the blue subpixel also proceeds accordingly. Therefore, the greater the deterioration of the blue subpixel is, the greater the influence of the blue subpixel on the deterioration of the red subpixel and the green subpixel. From this, regarding the compensation processing of the red subpixel and the green subpixel that are the second self-light-emitting pixels 103*b*, in order to add deterioration due to light emission of the blue subpixel that is the first self-light-emitting pixel 103*a*, the first state data 121*a* indicating the state of the blue subpixel may be referred to. Therefore, in the second compensation in the present embodiment, the temporal change of the second self-light-emitting pixel 103*b* is compensated based on the first state data 121*a* and the second state data 121*b*.

Note that according to an experiment by the inventors of the disclosure, it was not seen that the luminous efficiency of the blue subpixel was affected by the light emission of the red subpixel and the green subpixel configured to emit light longer in wavelength than the blue subpixel. Therefore, in the first compensation in the present embodiment, the temporal change of the first self-light-emitting pixel 103*a* is compensated based on the first state data 121*a* (in other words, not using the second state data 121*b*).

Figure 33:
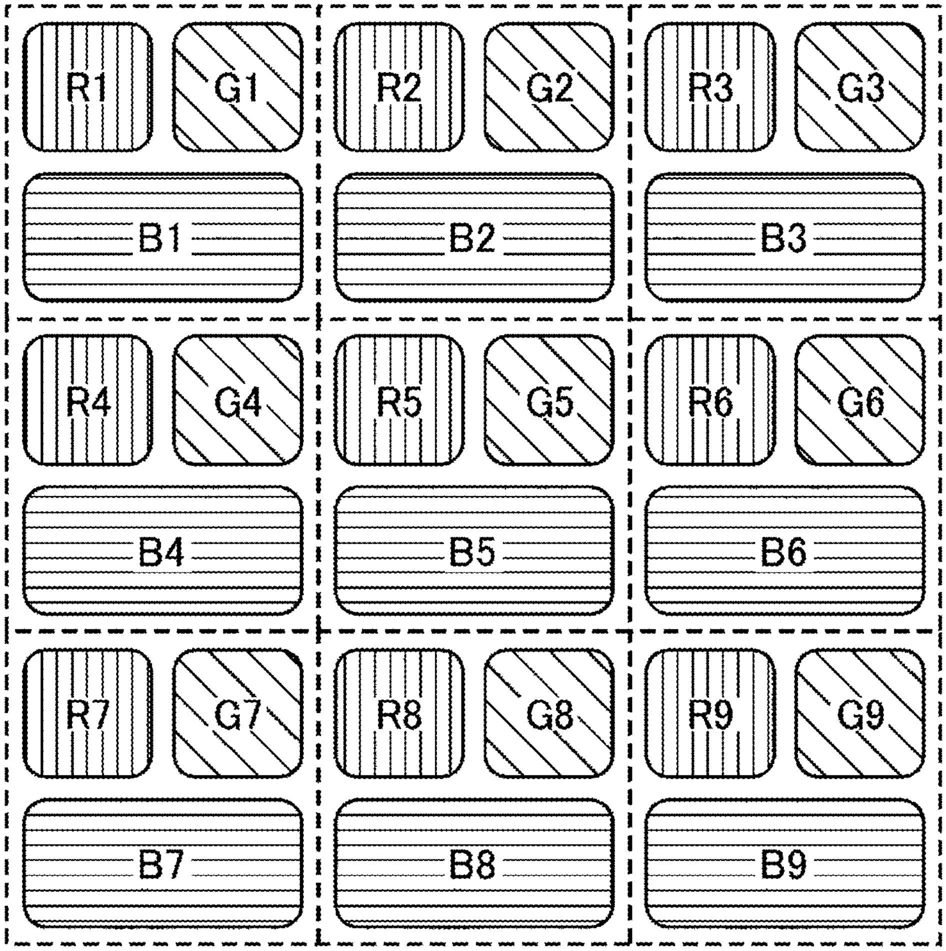
FIG. 33 is a view explaining a "predetermined position" in the disclosure.

Here, the "predetermined position" will be described with reference to FIG. 33. FIG. 33 illustrates a total of nine pixels in three vertical columns and three horizontal rows, and subpixels included therein. Here, attention is paid to a red subpixel R5. It is considered that a blue subpixel closer to the red subpixel R5 has a larger influence on deterioration of the red subpixel R5. Therefore, the blue subpixel that most affects the deterioration of the red subpixel R5 is a blue subpixel B5 in the same pixel. Therefore, the second compensation of the red subpixel R5 that is the second self-light-emitting pixel 103*b* is preferably performed based on the first state data 121*a* regarding the blue subpixel B5 that is the first self-light-emitting pixel 103*a* in addition to the second state data 121*b* regarding the red subpixel R5. For this reason, in the disclosure, the position of the blue subpixel B5 that is the first self-light-emitting pixel 103*a* closest to the red subpixel R5 that is the second self-light-emitting pixel 103*b* is called a "predetermined position".

A blue subpixel B2, a blue subpixel B4, and a blue subpixel B1, which are at positions close in order subsequently, may also affect the deterioration of the red subpixel R5. Therefore, in the second compensation of the red subpixel R5 that is the second self-light-emitting pixel 103*b*, not only the first state data 121*a* regarding the blue subpixel B5 that is the first self-light-emitting pixel 103*a* but also the first state data 121*a* regarding the blue subpixel B2, the blue subpixel B4, and the blue subpixel B1 may be used. That is, a plurality of pieces of the first state data 121*a* may be used in the second compensation. For this reason, in the disclosure, the positions of the blue subpixel B2, the blue subpixel B4, and the blue subpixel B1 that are the first self-light-emitting pixels 103*a* in the vicinity subsequent to the blue subpixel B5 with respect to the red subpixel R5 that is the second self-light-emitting pixel 103*b* may also be called "predetermined positions".

It is considered that what extent of distance to the red subpixel R5 in which the blue subpixel has an influence varies depending on, for example, the way of arranging the subpixels, and also varies depending on the structure, material, and the like of the pixel. Therefore, measurement or the like may be actually performed on the individual display panels 102 to determine use of the first state data 121*a* as to which blue subpixel in the second compensation for the red subpixel R5.

Note that considering similarly to a green subpixel G5, in the disclosure, the position of the blue subpixel B5 that is the first self-light-emitting pixel 103*a* closest to the green subpixel G5 that is the second self-light-emitting pixel 103*b* is called a "predetermined position". In the disclosure, the positions of the blue subpixel B2, a blue subpixel B6, and a blue subpixel B3 that are the first self-light-emitting pixels 103*a* in the vicinity subsequent to the blue subpixel B5 with respect to the green subpixel G5 that is the second self-light-emitting pixel 103*b* may also be called "predetermined positions".

From the above, regarding the pixels in which the red subpixel and the green subpixel that are the second self-light-emitting pixel 103*b* and the blue subpixel 1243 that is the first self-light-emitting pixel 103*a* emit light, it is necessary to apply a higher voltage to the second self-light-emitting pixel 103*b* than that for the pixel in which the blue subpixel 1243 that is the first self-light-emitting pixel 103*a* does not emit light.

Therefore, after the first display is performed in the first region included in the display panel 102 and the second display is performed in the second region included in the display panel 102, the compensation processing unit 114 makes the voltage applied to the second self-light-emitting pixel 103*b* included in the second region higher than the voltage applied to the second self-light-emitting pixel 103*b* included in the first region. Here, in the first display, it is assumed that the first self-light-emitting pixel 103*a* included in the first region emits first color light at a first gray scale value, and the second self-light-emitting pixel 103*b* included in the first region emits light at a second gray scale value higher than the first gray scale value. In the second display, it is assumed that the first self-light-emitting pixel 103*a* and the second self-light-emitting pixel 103*b* included in the second region emit light at the second gray scale value. More specifically, for example, the first display is display at the pixel 1201 illustrated in FIG. 12, and the second display is display at the pixel 1204 illustrated in FIG. 12.

Figure 14:
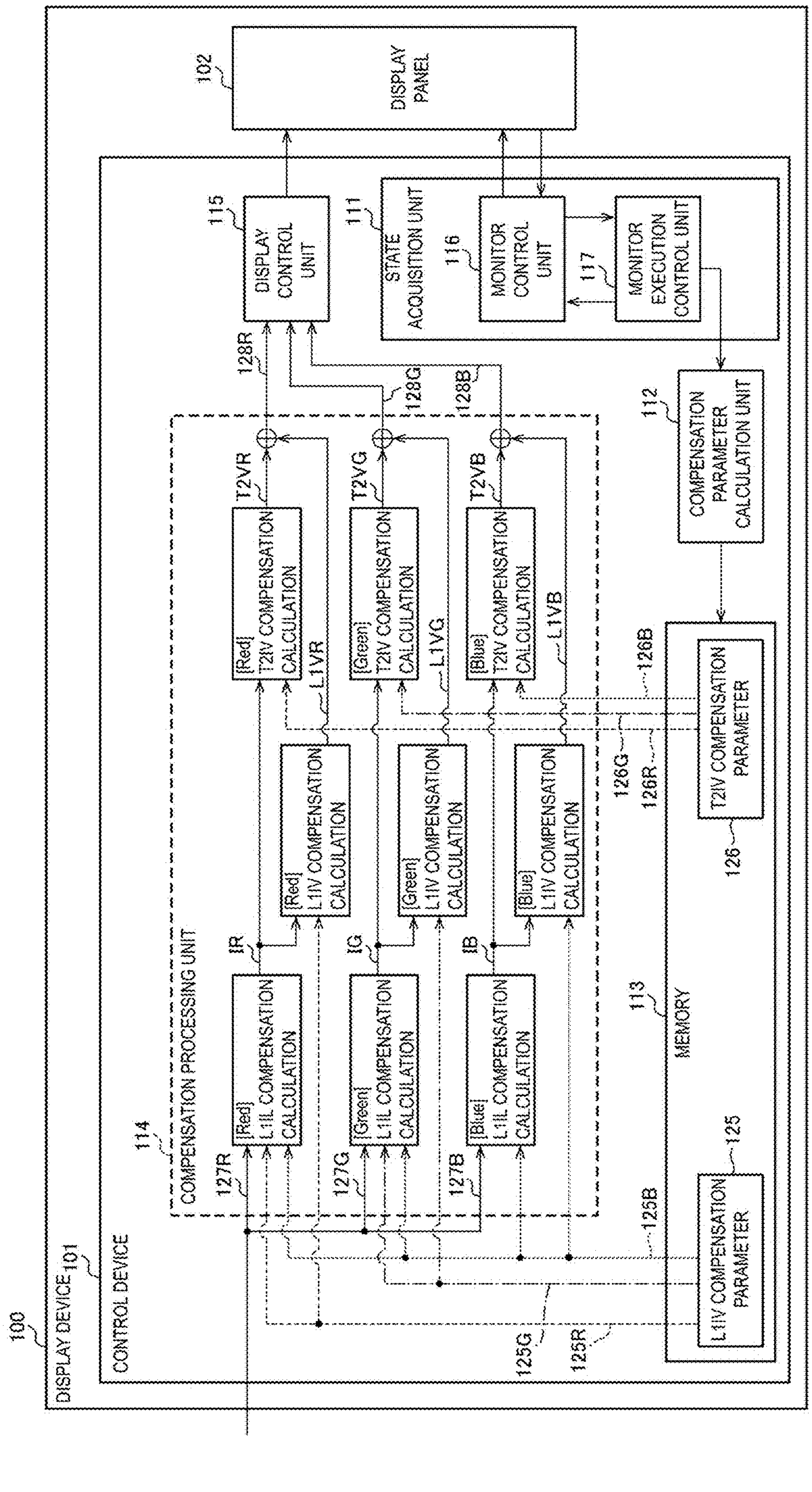
FIG. 14 is a block diagram illustrating an example of a configuration of a display device according to the first embodiment in a case where a first self-light-emitting pixel is a blue subpixel and a second self-light-emitting pixel is a red subpixel and a green subpixel.

FIG. 14 is a block diagram illustrating an example of the configuration of the display device 100 in a case where the first self-light-emitting pixel 103*a* is a blue subpixel and the second self-light-emitting pixel 103*b* is a red subpixel and a green subpixel. A gray scale value 127R is a gray scale value regarding a red subpixel constituting a pixel of the compensation target. A gray scale value 127G is a gray scale value regarding a green subpixel constituting a pixel of the compensation target. A gray scale value 127G is a gray scale value regarding a blue subpixel constituting a pixel of the compensation target.

The L1IV compensation parameter 125 saved in the memory 113 includes an L1IV compensation parameter 125R, an L1IV compensation parameter 125G, and a T2IV compensation parameter 126B. The L1IV compensation parameter 125R is a parameter for correcting the current-voltage characteristic of the self-light-emitting element L1*b* included in the red subpixel. The L1IV compensation parameter 125G is a parameter for correcting the current-voltage characteristic of the self-light-emitting element L1*b* included in the green subpixel. An L1IV compensation parameter 125B is a parameter for correcting the current-voltage characteristic of the self-light-emitting element L1*a* included in the blue subpixel.

The T2IV compensation parameter 126 saved in the memory 113 includes a T2IV compensation parameter 126R, an L1IV compensation parameter 124G, and the T2IV compensation parameter 126B. The T2IV compensation parameter 126R is a parameter for correcting the current-voltage characteristic of the drive transistor T2*b* included in the red subpixel. The T2IV compensation parameter 126G is a parameter for correcting the current-voltage characteristic of the drive transistor T2*b* included in the green subpixel. The T2IV compensation parameter 126B is a parameter for correcting the current-voltage characteristic of the drive transistor T2*a* included in the blue subpixel.

The compensation processing unit 114 compensates for the current luminance characteristic of the second self-light-emitting element L1*b* based on the L1IV compensation parameter 125R and the L1IV compensation parameter 125B, regarding the second self-light-emitting element L1*b* included in the red subpixel that is the second self-light-emitting pixel 103*b* ("[Red] L1IL compensation calculation" of the compensation processing unit 114). Specifically, the compensation processing unit 114 calculates the luminous efficiency compensation ratio based on the L1IV compensation parameter 125R and the L1IV compensation parameter 125B, regarding the second self-light-emitting element L1*b* included in the red subpixel. Then, the compensation processing unit 114 corrects the current luminance characteristic based on the calculated luminous efficiency compensation ratio, regarding the second self-light-emitting element L1*b* included in the red subpixel. Then, by inputting the gray scale value 127R to the corrected current luminance characteristic regarding the second self-light-emitting element L1*b* included in the red subpixel, the compensation processing unit 114 calculates a correction current value IR of the current necessary for outputting light having the luminance of the gray scale value 127R from the second self-light-emitting element L1*b* included in the red subpixel.

The compensation processing unit 114 compensates for the current-voltage characteristic based on the L1IV compensation parameter 125R, regarding the second self-light-emitting element L1*b* included in the red subpixel ("[Red] L1IV compensation calculation" of the compensation processing unit 114). Then, by inputting the correction current value IR to the compensated current-voltage characteristic, the compensation processing unit 114 calculates a voltage value L1VR of the voltage of the second self-light-emitting element L1*b* necessary for flowing the correction current value IR through the second self-light-emitting element L1*b*.

The compensation processing unit 114 compensates for the current-voltage characteristic based on the T2IV compensation parameter 126R, regarding the second drive transistor T2*b* included in the red subpixel ("[Red] T2IV compensation calculation" of the compensation processing unit 114). Then, by inputting the correction current value IR to the compensated current-voltage characteristic, the compensation processing unit 114 calculates a voltage value T2VR of the voltage of the second drive transistor T2*b* necessary for flowing the current having the correction current value IR.

Then, the compensation processing unit 114 calculates the sum of the voltage value L1VR and the voltage value T2VR as a drive voltage value 128R regarding the red subpixel.

A calculation method of a correction current value IG, a voltage value L1VG, a voltage value T2VG, and a drive voltage value 128G for the green subpixel that is the second self-light-emitting pixel 103*b* is similar to a calculation method of the correction current value IR, the voltage value L1VR, the voltage value T2VR, and the drive voltage value 128R, and the second compensation regarding the green subpixel is similar to the second compensation regarding the red subpixel. Therefore, detailed description will be omitted.

Next, the first compensation regarding a blue subpixel that is the first self-light-emitting pixel 103*a* will be described.

The compensation processing unit 114 compensates for the current luminance characteristic of the first self-light-emitting element L1*a* based on the L1IV compensation parameter 125B, regarding the first self-light-emitting element L1*a* included in the blue subpixel that is the first self-light-emitting pixel 103*a* ("[Blue] L1IL compensation calculation" of the compensation processing unit 114). Specifically, the compensation processing unit 114 calculates the luminous efficiency compensation ratio based on the L1IV compensation parameter 125B, regarding the first self-light-emitting pixel 103*a* included in the blue subpixel. Then, the compensation processing unit 114 corrects the current luminance characteristic based on the calculated luminous efficiency compensation ratio, regarding the first self-light-emitting element L1*a* included in the blue subpixel. Then, by inputting the gray scale value 127B to the corrected current luminance characteristic regarding the first self-light-emitting element L1*a* included in the blue subpixel, the compensation processing unit 114 calculates a correction current value IB of the current necessary for outputting light having the luminance of the gray scale value 127B from the first self-light-emitting element L1*a* included in the blue subpixel.

The compensation processing unit 114 compensates for the current-voltage characteristic based on the L1IV compensation parameter 125B, regarding the first self-light-emitting element L1*a* included in the blue subpixel ("[Blue] L1IV compensation calculation" of the compensation processing unit 114). Then, by inputting the correction current value IB to the compensated current-voltage characteristic, the compensation processing unit 114 calculates a voltage value L1VB of the voltage of the first self-light-emitting element L1*a* necessary for flowing the correction current value IB through the first self-light-emitting element L1*a*.

The compensation processing unit 114 compensates for the current-voltage characteristic based on the T2IV compensation parameter 126B, regarding the first drive transistor T2*a* included in the blue subpixel ("[Blue] T2IV compensation calculation" of the compensation processing unit 114). Then, by inputting the correction current value IB to the compensated current-voltage characteristic, the compensation processing unit 114 calculates a voltage value T2VB of the voltage of the first drive transistor T2*a* necessary for flowing the current having the correction current value IB.

Then, the compensation processing unit 114 calculates the sum of the voltage value L1VB and the voltage value T2VB as a drive voltage value 128B regarding the blue subpixel.

The display control unit 115 supplies the drive voltage value 128R, the drive voltage value 128G, and the drive voltage value 128B to the red subpixel, the green subpixel, and the blue subpixel, respectively.

The control device 101 compensates for a temporal change in the current luminance characteristic and the current-voltage characteristic of the red subpixel, the green subpixel, and the blue subpixel, whereby the red subpixel, the green subpixel, and the blue subpixel can emit light having luminance of the gray scale value 127R, the gray scale value 127G, and the gray scale value 127B.

As described above, the control device 101 according to the present embodiment can appropriately compensate for a temporal change in the electrical characteristic of the self-light-emitting pixel 103 based on the state of the self-light-emitting pixel 103 of the compensation target and the state of the surrounding self-light-emitting pixel 103, in accordance with the wavelength of light emitted from the self-light-emitting pixel 103.

Modification of First Embodiment

As a modification of the display device 100 according to the present embodiment, the compensation parameter calculation unit 112 may acquire past first state data 121*a* and second state data 121*b* from the memory 113, and determine a new first compensation parameter 124*a* and a new second compensation parameter 124*b* based on the past first state data 121*a* and the second state data 121*b* that are acquired.

Second Embodiment

The second embodiment will be described with reference to FIGS. 15 to 19. Note that in the drawings, identical or equivalent elements are given an identical reference sign, and redundant descriptions thereof may be omitted. Configurations and processing having substantially common functions to those of the other embodiments will be referred to by common reference signs, description thereof will be omitted, and differences from the other embodiments will be described.

Figure 15:
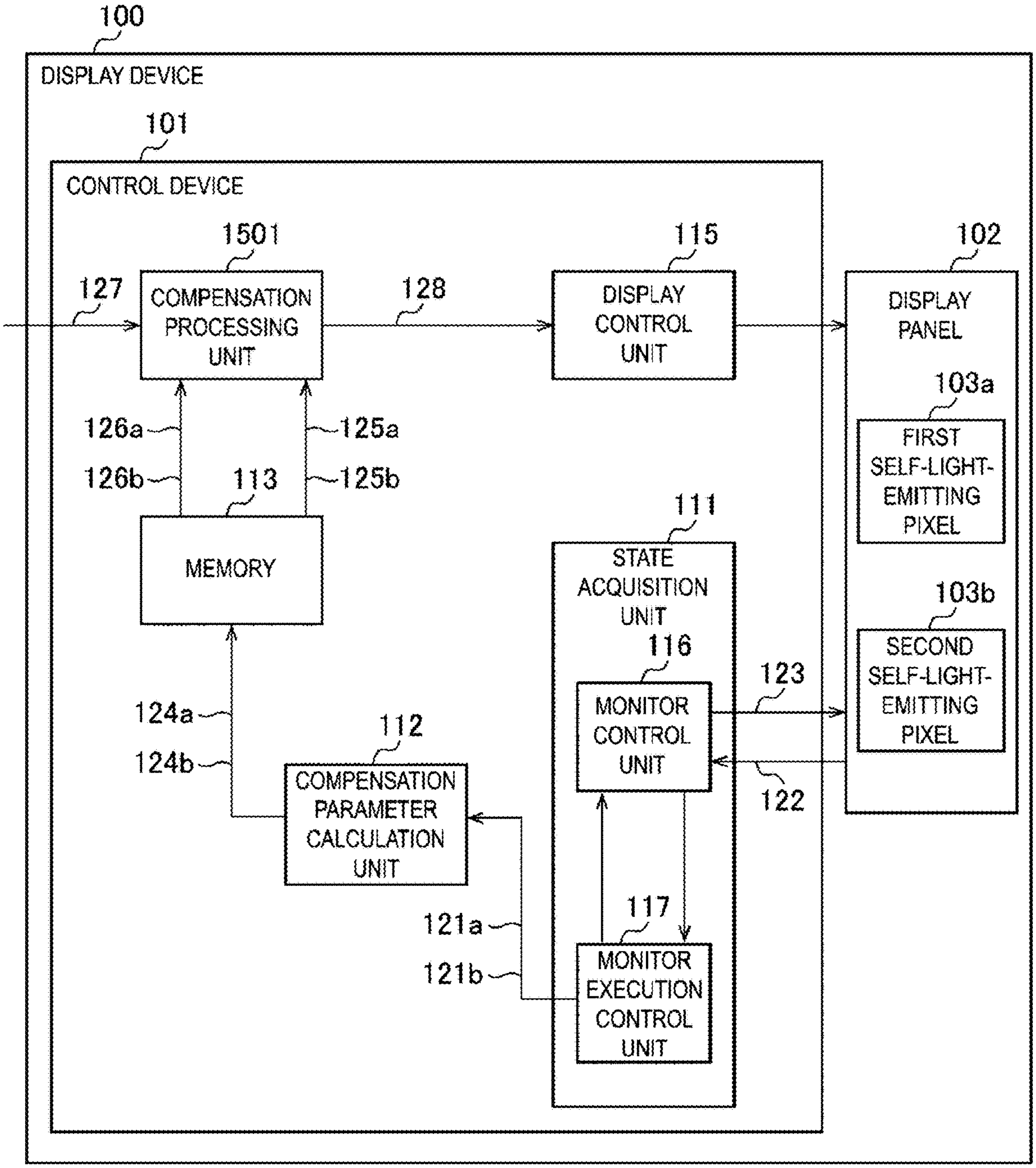
FIG. 15 is a block diagram illustrating an example of a configuration of a display device according to a second embodiment.

FIG. 15 is a block diagram illustrating an example of the configuration of the display device 100 according to the present embodiment. A difference between the display device 100 illustrated in FIG. 15 and the display device 100 illustrated in FIG. 1 lies in that the display device 100 illustrated in FIG. 15 includes a compensation processing unit 1501 in place of the compensation processing unit 114.

The first state data 121*a* according to the present embodiment indicates the state of the first self-light-emitting element L1*a* and the state of the first drive transistor T2*a*. The second state data 121*b* according to the present embodiment indicates the state of the second self-light-emitting element L1*b*.

The first compensation according to the present embodiment compensates for a temporal change in the current luminance characteristic of the first self-light-emitting element L1*a* based on the state of the first self-light-emitting element L1*a* indicated by the first state data 121*a*. Furthermore, the second compensation according to the present embodiment compensates for a temporal change in the current luminance characteristic of the second self-light-emitting element L1*b* based on the state of the first drive transistor T2*a* and the state of the second self-light-emitting element L1*b*.

Figure 16A:
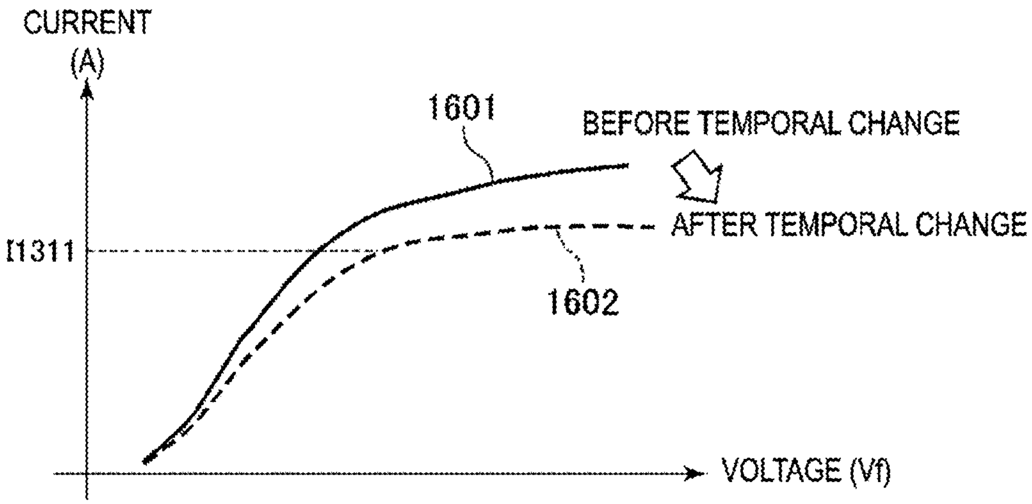
FIG. 16A is a view showing an example of a current-voltage characteristic before a temporal change and an example of a current-voltage characteristic after the temporal change regarding a self-light-emitting element.
Figure 16B:
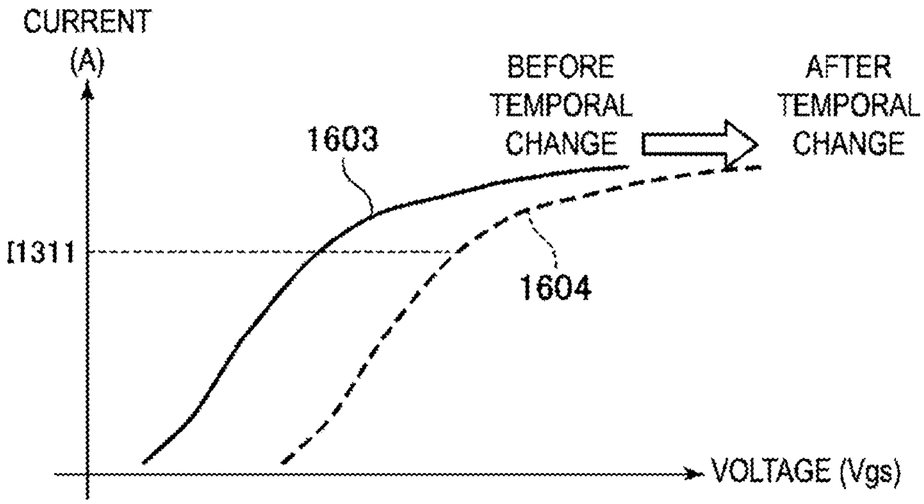
FIG. 16B is a view showing an example of a current-voltage characteristic before a temporal change and an example of a current-voltage characteristic after the temporal change regarding a drive transistor.

FIG. 16A is a view showing a graph 1601 showing an example of the current-voltage characteristic before a temporal change and a graph 1602 showing an example of the current-voltage characteristic after the temporal change regarding the self-light-emitting element L1. FIG. 16B is a view showing a graph 1603 showing an example of the current-voltage characteristic before a temporal change and a graph 1604 showing an example of the current-voltage characteristic after the temporal change regarding the drive transistor T2. In FIGS. 16A and 16B, the horizontal axes represent the voltage, and the vertical axes represent the current. More specifically, the horizontal axis in FIG. 16A indicates a forward voltage Vf of the self-light-emitting element L1. The horizontal axis in FIG. 16B indicates a gate-source voltage Vgs of the drive transistor T2. It is assumed that the elapsed time from before the temporal change to after the temporal change in the current-voltage characteristic shown in FIG. 16A is the same as the elapsed time from before the temporal change to after the temporal change in the current-voltage characteristic shown in FIG. 16B. In the following description, a difference between the voltage value before a temporal change and the voltage value after the temporal change, which is necessary for causing the current having the same current value to flow through the drive transistor T2, is called a voltage shift amount ΔVgs.

As shown in FIG. 16A, regarding the current-voltage characteristic regarding the self-light-emitting element L1, the shape of the graph is more inclined after the temporal change than before the temporal change. On the other hand, as shown in FIG. 16B, regarding the current-voltage characteristics regarding the drive transistor T2, the graph tends to be shifted in parallel after the temporal change compared with before the temporal change. Furthermore, the change amount of the current-voltage characteristic of the drive transistor T2 is larger than the change amount of the current-voltage characteristic of the self-light-emitting element L1. Therefore, since the second compensation according to the present embodiment is based on the state of the first drive transistor T2*a*, accuracy is easily improved as compared with the second compensation according to the first embodiment.

Figure 17:
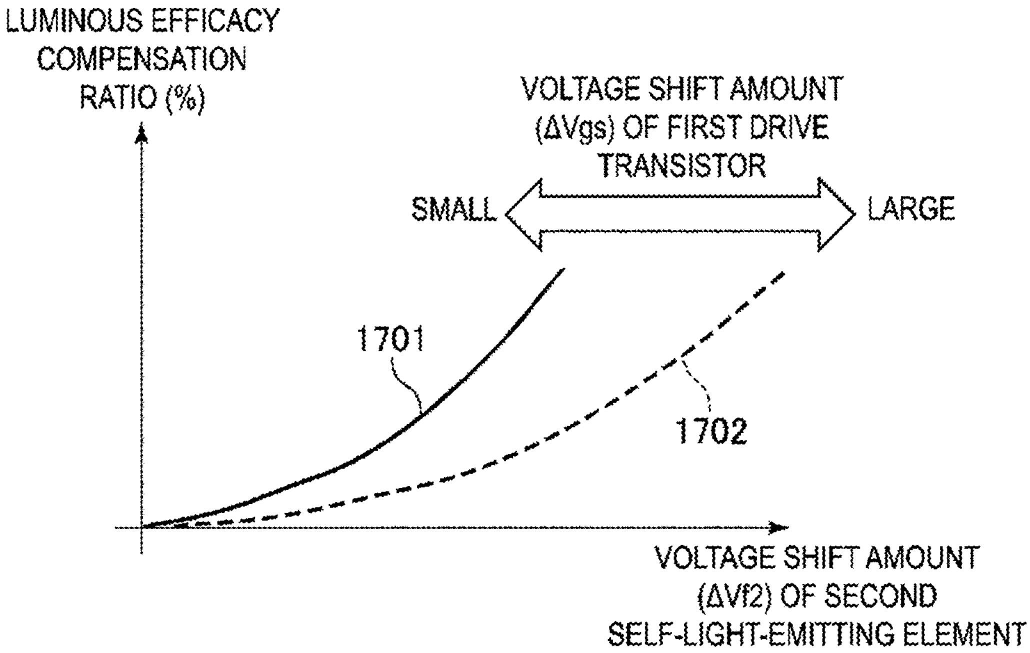
FIG. 17 shows an example of a relationship between a voltage shift amount regarding a self-light-emitting element and a luminous efficiency compensation ratio, in accordance with a voltage shift amount regarding the drive transistor.

FIG. 17 shows an example of the relationship between the voltage shift amount ΔVf2 regarding the second self-light-emitting element L1*b* and the luminous efficiency compensation ratio, in accordance with the voltage shift amount ΔVgs regarding the first drive transistor T2*a*. In FIG. 17, the horizontal axis represents the voltage shift amount regarding the second self-light-emitting element L1*b*, and the vertical axis represents the luminous efficiency compensation ratio. A graph 1701 and a graph 1702 show the characteristic of the second self-light-emitting element L1*b* in a case where the voltage shift amount ΔVgs regarding the state of the first drive transistor T2*a* included in the first self-light-emitting pixel 103*a* that is at a predetermined position from the second self-light-emitting pixel 103*b* including the second self-light-emitting element L1*b* is relatively small and in a case where that is large. The inventors of the disclosure have thus found that the characteristic of the second self-light-emitting element L1*b* is relevant to the state of the first drive transistor T2*a* included in the first self-light-emitting pixel 103*a* that is at a predetermined position from the second self-light-emitting pixel 103*b* including the second self-light-emitting element L1*b*. This can be considered as follows. As described above with reference to FIG. 6A, the characteristic of the second self-light-emitting element L1*b* is relevant to the state of the first self-light-emitting element L1*a* included in the first self-light-emitting pixel 103*a* that is at a predetermined position from the second self-light-emitting pixel 103*b* including the second self-light-emitting element L1*b*. In a case where the first self-light-emitting element L1*a* included in the first self-light-emitting pixel 103*a* is deteriorated, it is considered that the first drive transistor T2*a* configured to control the current flowing through the first self-light-emitting element L1*a* is also deteriorated.

Regarding the current-voltage characteristic regarding the drive transistor T2, since the graph tends to be shifted in parallel after the temporal change as compared to before the temporal change, the change in the current luminance characteristics between the voltage shift amount ΔVf2 regarding the state of the second self-light-emitting element L1*b* and the luminous efficiency compensation ratio in accordance with the voltage shift amount ΔVgs regarding the state of the first drive transistor T2*a* tends to be a linear change.

Figure 18:
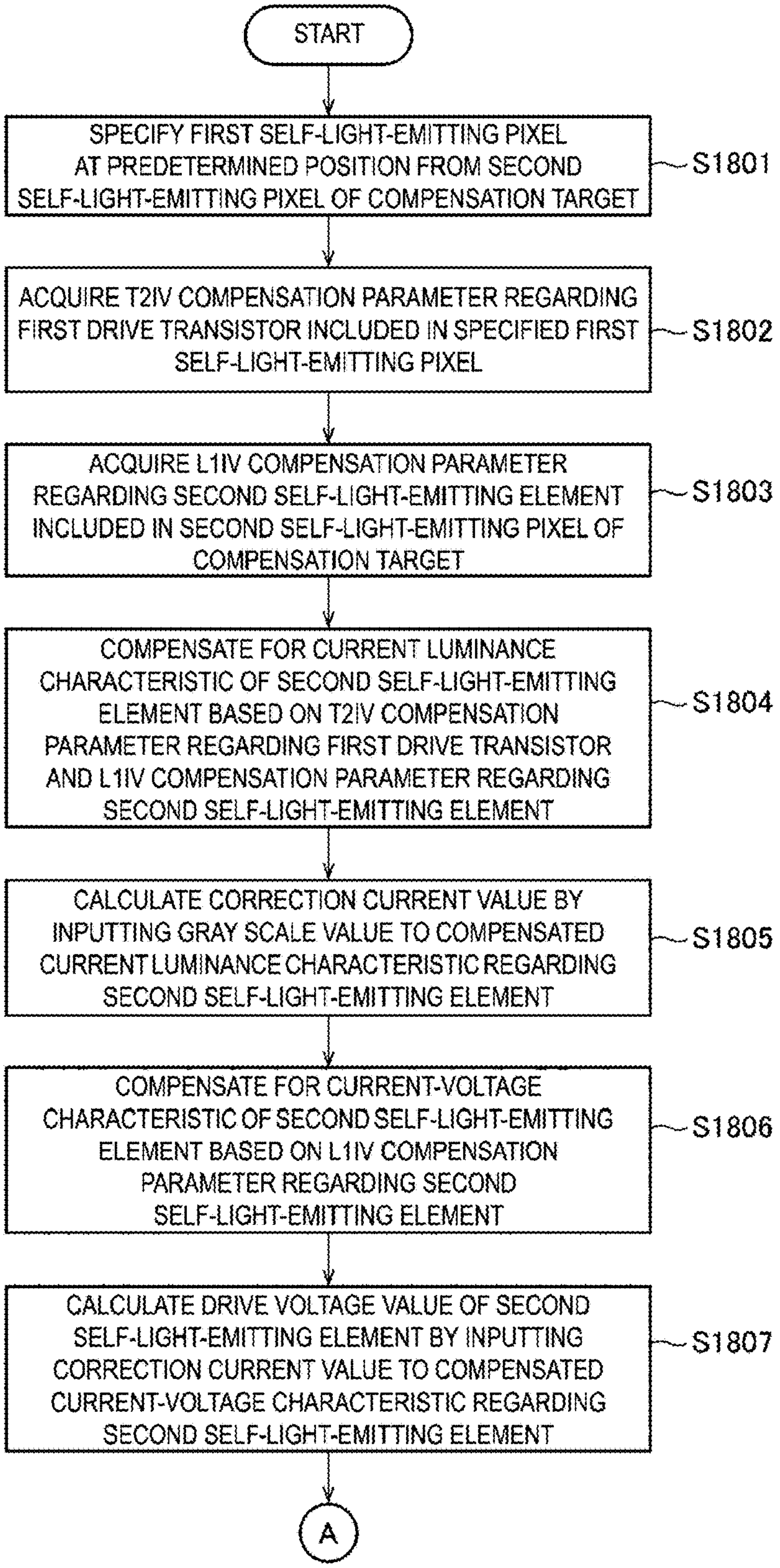
FIG. 18 is a flowchart showing an example of second compensation in a control device according to the second embodiment.

Next, the second compensation regarding the second self-light-emitting pixel 103*b* of the compensation target will be described with reference to FIG. 18. FIG. 18 is a flowchart showing an example of the second compensation in the control device 101 according to the present embodiment. In the description regarding FIG. 18, the first self-light-emitting element L1*a*, the second self-light-emitting element L1*b*, the first drive transistor T2*a*, and the second drive transistor T2*b* are the same as those in the description regarding FIG. 9. Furthermore, the processing of step S1801 is similar to the processing of step S901 shown in FIG. 9, and therefore detailed description thereof will be omitted.

In step S1802, the compensation processing unit 1501 acquires, from the memory 113, the T2IV compensation parameter 126*a* regarding the first drive transistor T2*a* included in the first self-light-emitting pixel 103*a* specified in step S1801.

In step S1803, the compensation processing unit 1501 acquires the L1IV compensation parameter 125*b* regarding the second self-light-emitting element L1*b* from the memory 113.

In step S1804, the compensation processing unit 1501 compensates for a temporal change in the current luminance characteristic of the second self-light-emitting element L1*b* based on the L1IV compensation parameter 125*a* regarding the first drive transistor T2*a* and the L1IV compensation parameter 125*b* regarding the second self-light-emitting element L1*b*. Then, the compensation processing unit 114 transitions the process to step S1805. The processing of steps S1805 to S1807 is similar to the processing of steps S905 to S907 shown in FIG. 9, and therefore detailed description thereof will be omitted. Furthermore, in a case of calculating the voltage value of the voltage of the second self-light-emitting element L1*b* in step S1807, the compensation processing unit 114 transitions the process to step S1001 shown in FIG. 10.

Figure 19:
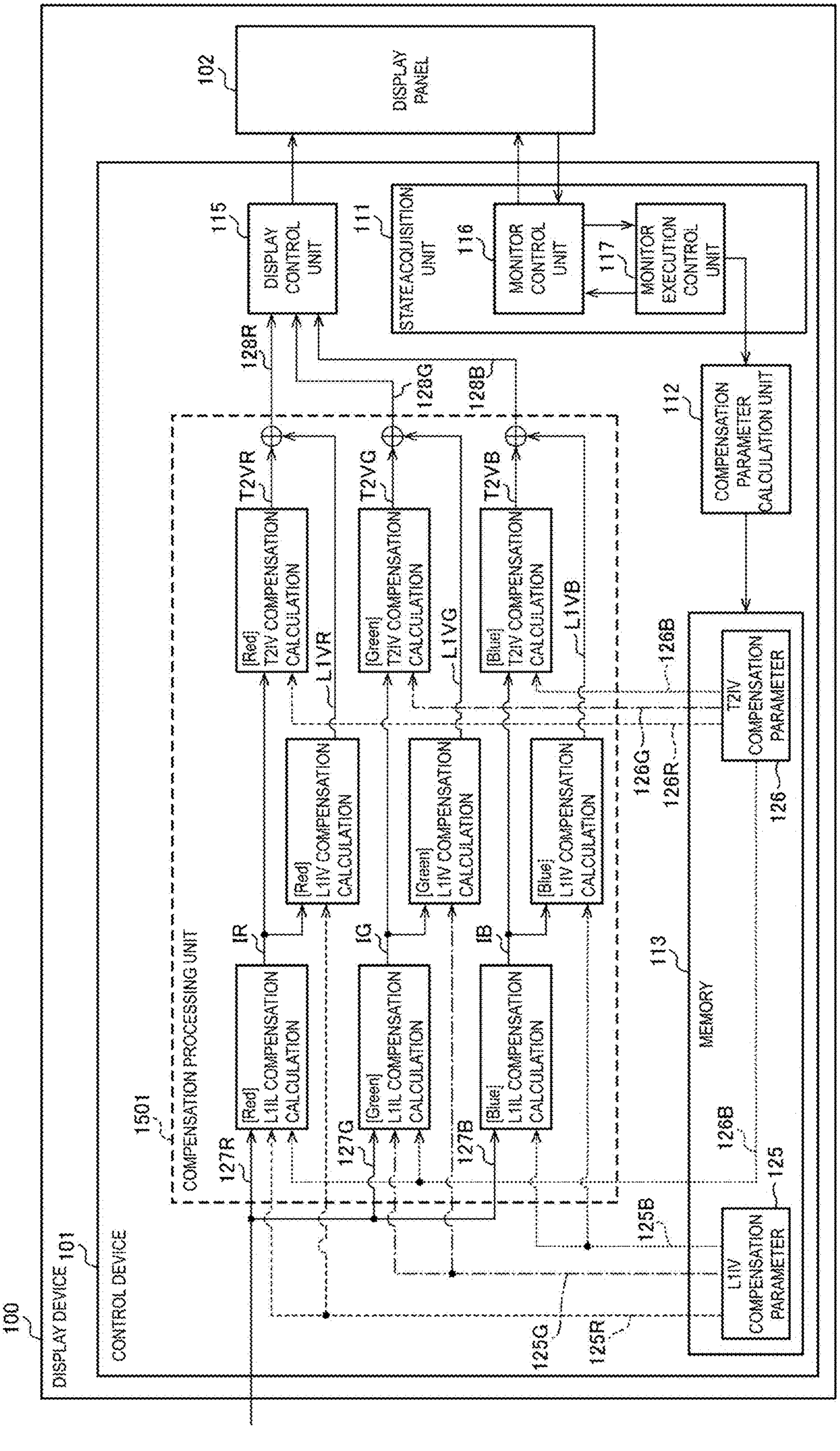
FIG. 19 is a block diagram illustrating an example of a configuration of a display device according to the second embodiment in a case where the first self-light-emitting pixel is a blue subpixel and the second self-light-emitting pixel is a red subpixel and a green subpixel.

FIG. 19 is a block diagram illustrating an example of the configuration of the display device 100 according to the present embodiment in a case where the first self-light-emitting pixel 103*a* is a blue subpixel and the second self-light-emitting pixel 103*b* is a red subpixel and a green subpixel. In the following description, processing regarding the pixel of the compensation target will be described.

The compensation processing unit 1501 compensates for the current luminance characteristic of the second self-light-emitting element L1*b* based on the L1IV compensation parameter 125R and the T2IV compensation parameter 126B, regarding the second self-light-emitting element L1*b* included in the red subpixel that is the second self-light-emitting pixel 103*b* ("[Red] L1IL compensation calculation" of the compensation processing unit 1501). Specifically, the compensation processing unit 1501 calculates the luminous efficiency compensation ratio based on the L1IV compensation parameter 125R and the T2IV compensation parameter 126B, regarding the second self-light-emitting element L1*b* included in the red subpixel. Regarding the red subpixel that is the second self-light-emitting pixel 103*b*, the subsequent processing is the same as that of the configuration of the display device 100 illustrated in FIG. 14, and therefore detailed description thereof will be omitted.

In the compensation processing unit 1501, the second compensation regarding the green subpixel that is the second self-light-emitting pixel 103*b* is similar to the second compensation regarding the red subpixel, and therefore detailed description thereof will be omitted. The blue subpixel that is the second self-light-emitting pixel 103*b* has the same configuration as that of the display device 100 illustrated in FIG. 14, and therefore detailed description thereof will be omitted.

As described above, the control device 101 according to the present embodiment compensates for a temporal change in the current luminance characteristic of the second self-light-emitting element L1*b* based on the state of the first drive transistor T2*a* and the state of the second self-light-emitting element L1*b*. Since the change amount of the current-voltage characteristic of the drive transistor T2 is larger than the change amount of the current-voltage characteristic of the self-light-emitting element L1, the control device 101 according to the present embodiment estimates a temporal change in the current luminance characteristic more easily than the control device 101 according to the first embodiment, and the accuracy of compensating for the temporal change in the current luminance characteristic is improved.

Modification of Second Embodiment

As a modification of the display device 100 according to the present embodiment, the first element may further include the first self-light-emitting element L1*a* and the first drive transistor T2*a*, and the second element may further include the second self-light-emitting element L1*b* and the second drive transistor T2*b*. The first state data 121*a* indicates the state of the first drive transistor T2*a*. The compensation processing unit 1501 compensates for a temporal change in the current luminance characteristic of the first self-light-emitting element L1*a* based on the state of the first drive transistor T2*a* indicated by the first state data 121*a* as the first compensation. The second state data 121*b* indicates the state of the second drive transistor T2*b*. The compensation processing unit 1501 compensates for a temporal change in the current luminance characteristic of the second self-light-emitting element L1*b* based on the state of the first drive transistor T2*a* and the state of the second drive transistor T2*b* as the second compensation.

Third Embodiment

The third embodiment will be described with reference to FIGS. 20 to 26. Note that in the drawings, identical or equivalent elements are given an identical reference sign, and redundant descriptions thereof may be omitted. Configurations and processing having substantially common functions to those of the other embodiments will be referred to by common reference signs, description thereof will be omitted, and differences from the other embodiments will be described.

Figure 20:
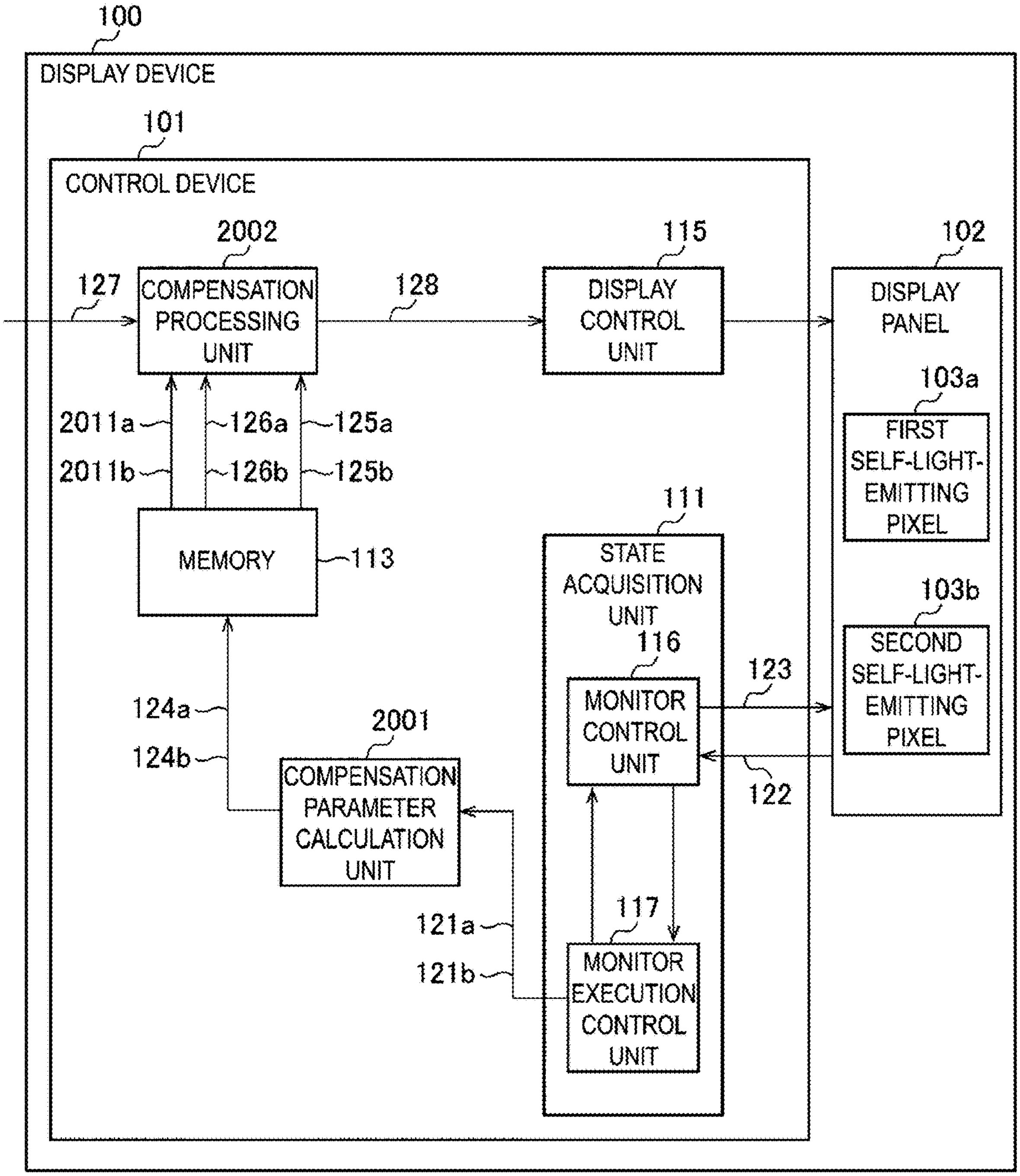
FIG. 20 is a block diagram illustrating an example of a configuration of a display device according to a third embodiment.

FIG. 20 is a block diagram illustrating an example of the configuration of the display device 100 according to the present embodiment. A difference between the display device 100 illustrated in FIG. 20 and the display device 100 illustrated in FIG. 1 lies in that the display device 100 illustrated in FIG. 20 includes a compensation parameter calculation unit 2001 and a compensation processing unit 2002 in place of the compensation parameter calculation unit 112 and the compensation processing unit 114.

The first state data 121*a* according to the present embodiment indicates the state of the first self-light-emitting element L1*a* and the state of the first drive transistor T2*a*. The second state data 121*b* according to the present embodiment indicates the state of the second self-light-emitting element L1*b*.

The compensation parameter calculation unit 2001 calculates the first compensation parameter 124*a* based on the first state data 121*a*, and calculates the second compensation parameter 124*b* based on the first state data 121*a* and second state data 122*a*.

Specifically, the compensation parameter calculation unit 2001 calculates, as the first compensation parameter 124*a*, an L1IL compensation parameter 2011*a* based on the state of the first self-light-emitting element L1*a*. A conversion model regarding the first self-light-emitting element L1*a* is determined by the L1IL compensation parameter 2011*a*. For example, the conversion model regarding the first self-light-emitting element L1*a* indicates a conversion equation for compensating for a temporal change in the current luminance characteristic regarding the first self-light-emitting element L1*a*.

Furthermore, the compensation parameter calculation unit 2001 calculates, as the second compensation parameter 124*b*, an L1IL compensation parameter 2011*b* regarding the second self-light-emitting pixel 103*b* based on the state of the second self-light-emitting element L1*b* and the state of the first drive transistor T2*a*. A conversion model regarding the second self-light-emitting element L1*b* is determined by the L1IL compensation parameter 2011*b*. For example, the conversion model regarding the second self-light-emitting element L1*b* indicates a conversion equation for compensating for a temporal change in the current luminance characteristic regarding the second self-light-emitting element L1*b*. Note that in the following description, when the L1IL compensation parameter 2011*a* and the L1IL compensation parameter 2011*b* are not distinguished, they are called L1IL compensation parameter 2011.

The compensation parameter calculation unit 2001 calculates the L1IV compensation parameter 125*a* based on the state of the first self-light-emitting element L1*a*. Similarly, the compensation parameter calculation unit 2001 calculates the T2IV compensation parameter 126*a* based on the state of the first drive transistor T2*a*. Furthermore, the compensation parameter calculation unit 2001 calculates the L1IV compensation parameter 125*b* based on the state of the second self-light-emitting element L1*b*. Similarly, the compensation parameter calculation unit 2001 calculates the T2IV compensation parameter 126*b* based on the state of the second drive transistor T2*b*.

The memory 113 according to the present embodiment saves the L1IV compensation parameter 125 and the T2IV compensation parameter 126, regarding the self-light-emitting pixel 103. Furthermore, the memory 113 according to the present embodiment saves the L1IL compensation parameter 2011*a* and the L1IL compensation parameter 2011*b*.

The compensation processing unit 2002 compensates for a temporal change in the current luminance characteristic of the first self-light-emitting element L1*a* based on the first compensation parameter 124*a* as the first compensation. Furthermore, the compensation processing unit 2002 compensates for a temporal change in the current luminance characteristic of the second self-light-emitting element L1*b* based on the second compensation parameter 124*b* as the second compensation.

Figure 21:
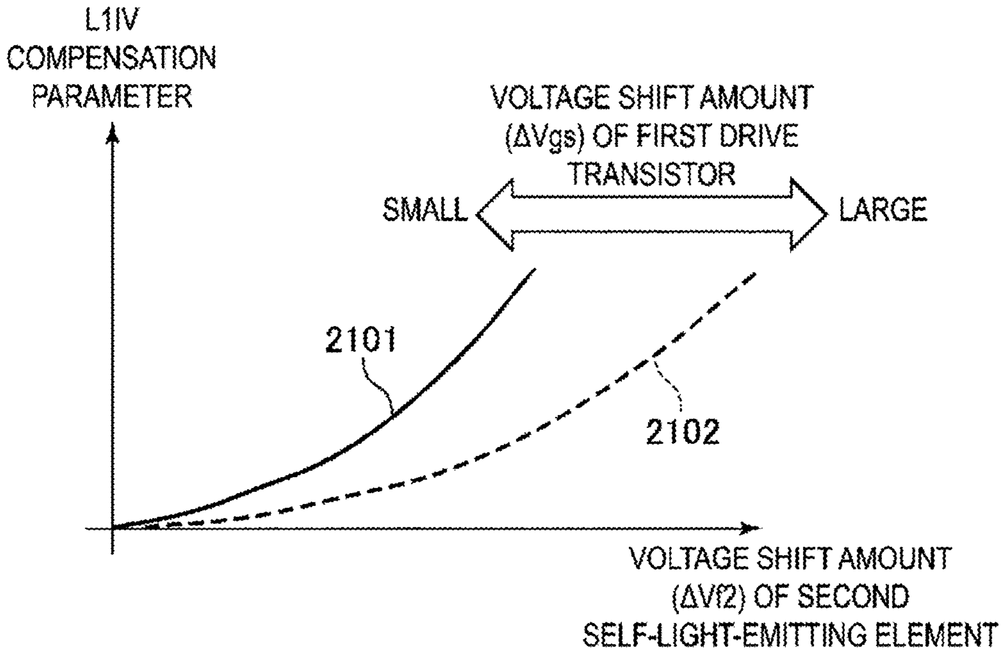
FIG. 21 illustrates an example of a relationship between a voltage shift amount regarding the second self-light-emitting element and an L1IL compensation parameter, in accordance with a voltage shift amount regarding the first self-light-emitting element.

FIG. 21 shows an example of the relationship between the voltage shift amount ΔVf2 regarding the second self-light-emitting element L1*b* and the L1IL compensation parameter 2011*b*, in accordance with the voltage shift amount ΔVgs regarding the first drive transistor T2*a*. In FIG. 21, the horizontal axis represents the voltage shift amount regarding the second self-light-emitting pixel 103*b*, and the vertical axis represents the L1IL compensation parameter.

For example, it is assumed that the memory 113 saves the relationship between the voltage shift amount ΔVf2 regarding the second self-light-emitting element L1*b* shown by a graph 2101 and a graph 2102 and the L1IL compensation parameter 2011*b*. The graph 2101 and the graph 2102 show examples of the relationship between the voltage shift amount ΔVf2 regarding the state of the second self-light-emitting element L1*b* and the L1IL compensation parameter 2011*b* in a case where the voltage shift amount ΔVgs regarding the state of the first drive transistor T2*a* that is at a predetermined position from the second self-light-emitting pixel 103*b* including the second self-light-emitting element L1*b* is relatively small and in a case where that is large.

For example, as shown in Expression (3), the compensation processing unit 2002 calculates the L1IL compensation parameter 2011*b* regarding the second self-light-emitting pixel 103*b* by multiplying one piece of LUT data corresponding to the voltage shift amount ΔVf2 regarding the state of the second self-light-emitting element L1*b* by the coefficient k corresponding to the voltage shift amount ΔVgs regarding the state of the first drive transistor T2*a*.

[Expression 3]

$$L1IL \text{ COMPENSATION PARAMETER} = LUT(\Delta Vf2) \times k(\Delta Vgs) \quad (3)$$

Figure 22:
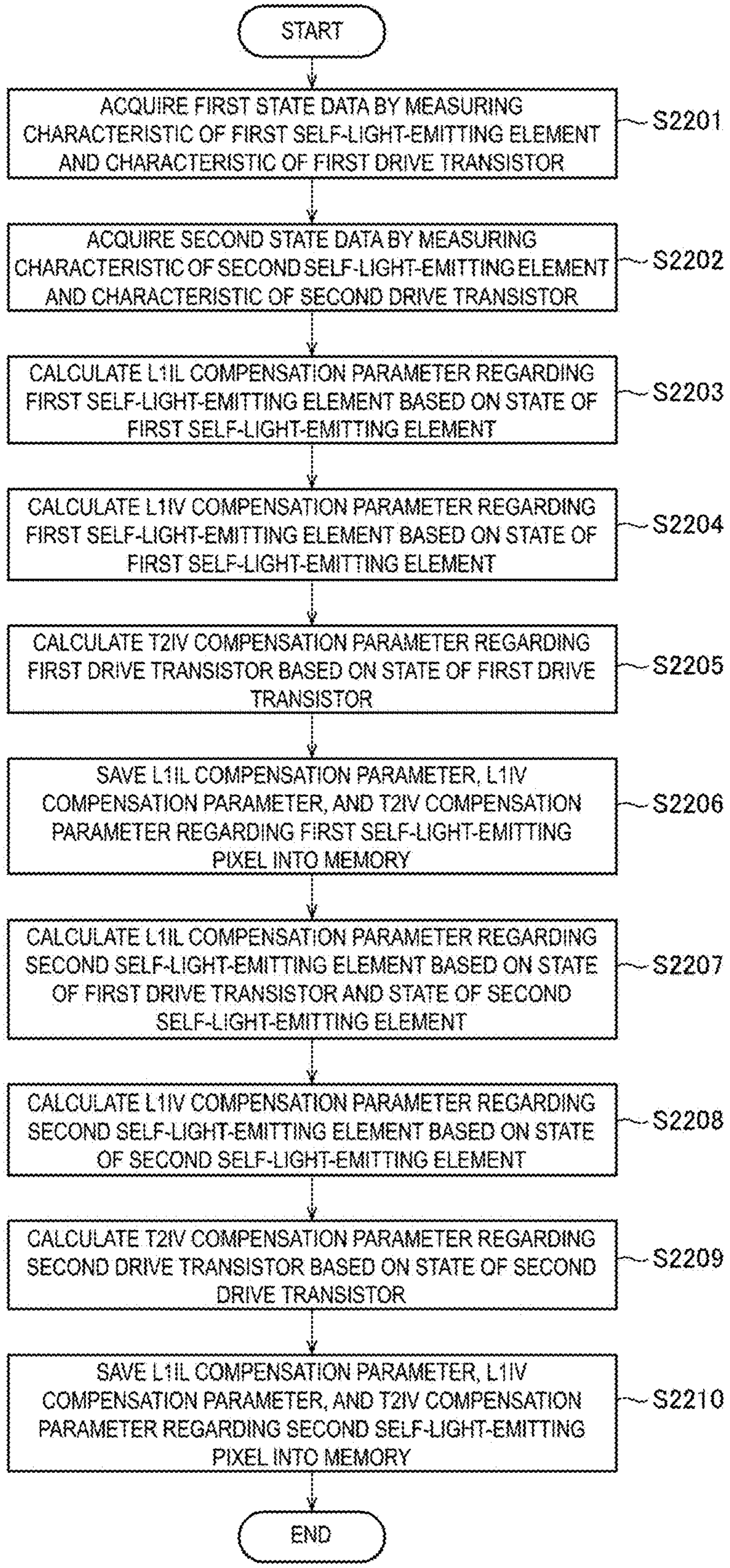
FIG. 22 is a flowchart showing an example of operation of a control device according to the third embodiment.

Next, processing of calculating the first compensation parameter 124*a* of the first self-light-emitting pixel 103*a* of the measurement target and the second compensation parameter 124*b* of the second self-light-emitting pixel 103*b* of the measurement target will be described with reference to FIG. 22. FIG. 22 is a flowchart showing an example of the operation of the control device 101 according to the present embodiment. In the description regarding FIG. 22, the first self-light-emitting element L1*a*, the second self-light-emitting element L1*b*, the first drive transistor T2*a*, and the second drive transistor T2*b* are the same as those in the description regarding FIG. 7.

In step S2201, the state acquisition unit 111 acquires the first state data 121*a* by measuring the electrical characteristic of the first element included in the first self-light-emitting pixel 103*a*. In the present embodiment, the first element includes the first self-light-emitting element L1*a* and the first drive transistor T2*a*. Specifically, the state acquisition unit 111 acquires the first state data 121*a* by measuring the electrical characteristic of the first self-light-emitting element L1*a* and the electrical characteristic of the first drive transistor T2*a*.

In step S2202, the state acquisition unit 111 acquires the second state data 121*b* by measuring the electrical characteristic of the second element included in the second self-light-emitting pixel 103*b*. In the present embodiment, the second element includes the second self-light-emitting element L1*b*. Specifically, the state acquisition unit 111 acquires the second state data 121*b* by measuring the electrical characteristic of the second self-light-emitting element L1*b*. In step S2202, the state acquisition unit measures the electrical characteristic of the second drive transistor T2*b*.

In step S2203, the compensation parameter calculation unit 2001 calculates the L1IL compensation parameter 2011*a* regarding the first self-light-emitting element L1*a* based on the state of the first self-light-emitting element L1*a* indicated by the first state data 121*a*.

In step S2204, the compensation parameter calculation unit 2001 calculates the L1IV compensation parameter 125*a* regarding the first self-light-emitting element L1*a* based on the state of the first self-light-emitting element L1*a* indicated by the first state data 121*a*.

In step S2205, the compensation parameter calculation unit 2001 calculates the T2IV compensation parameter 126*a* regarding the first drive transistor T2*a* based on the state of the first drive transistor T2*a* indicated by the first state data 121*a*.

In step S2206, the compensation parameter calculation unit 2001 saves the L1IL compensation parameter 2011*a*, the L1IV compensation parameter 125*a*, and the T2IV compensation parameter 126*a* regarding the first self-light-emitting pixel 103*a* into the memory 113 in association with the identification information of the first self-light-emitting pixel 103*a* of the measurement target. Note that in the present embodiment, the first compensation parameter 124*a* includes the L1IL compensation parameter 2011*a*, the L1IV compensation parameter 125*a*, and the T2IV compensation parameter 126*a*.

In step S2207, the compensation parameter calculation unit 2001 calculates the L1IL compensation parameter 2011*b* regarding the second self-light-emitting element L1*b* based on the state of the first drive transistor T2*a* indicated by the first state data 121*a* and the state of the second self-light-emitting element L1*b* indicated by the second state data 121*b*.

In step S2208, the compensation parameter calculation unit 2001 calculates the L1IV compensation parameter 125*b* regarding the second self-light-emitting element L1*b* based on the state of the second self-light-emitting element L1*b* indicated by the second state data 121*b*.

In step S2209, the compensation parameter calculation unit 2001 calculates the T2IV compensation parameter 126*b* regarding the second drive transistor T2*b* based on the electrical characteristic of the second drive transistor T2*b*.

In step S2210, the compensation parameter calculation unit 2001 saves the L1IL compensation parameter 2011*b*, the L1IV compensation parameter 125*b*, and the T2IV compensation parameter 126*b* regarding the second self-light-emitting pixel 103*b* into the memory 113 in association with the identification information of the second self-light-emitting pixel 103*b* of the measurement target. Note that in the present embodiment, the second compensation parameter 124*b* includes the L1IL compensation parameter 2011*b*, the L1IV compensation parameter 125*b*, and the T2IV compensation parameter 126*b*.

Figure 23:
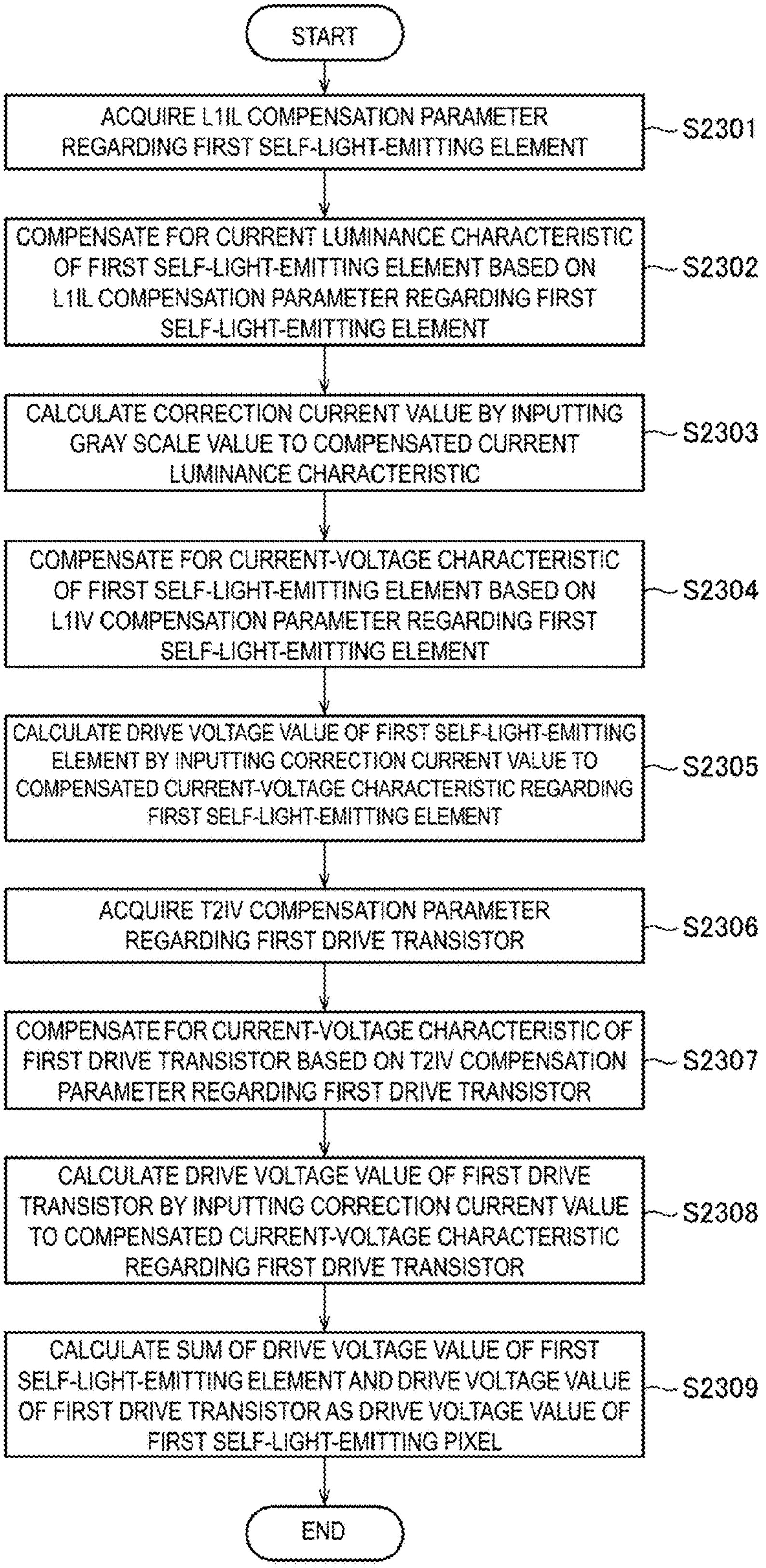
FIG. 23 is a flowchart showing an example of first compensation in the control device according to the third embodiment.

Next, the first compensation regarding the first self-light-emitting pixel 103*a* will be described with reference to FIG. 23. FIG. 23 is a flowchart showing an example of the first compensation in the control device 101 according to the present embodiment. In the description regarding FIG. 23, the first self-light-emitting element L1*a* and the first drive transistor T2*a* are the same as those in the description regarding FIG. 8.

In step S2301, the compensation processing unit 2002 acquires the L1IL compensation parameter 2011*a* regarding the first self-light-emitting element L1*a* from the memory 113.

In step S2302, the compensation processing unit 2002 compensates, as the first compensation, the current luminance characteristic of the first self-light-emitting element L1*a* based on the L1IL compensation parameter 2011*a*. That is, the first compensation includes compensating for a temporal change in the current luminance characteristic of the first self-light-emitting element L1*a* based on the first compensation parameter 124*a* calculated based on the first state data 121*a*. Then, the compensation processing unit 2002 transitions the process to step S2303. The processing of steps S2303 to S2309 is similar to the processing of steps S803 to S809 shown in FIG. 8, and therefore detailed description thereof will be omitted.

Figure 24:
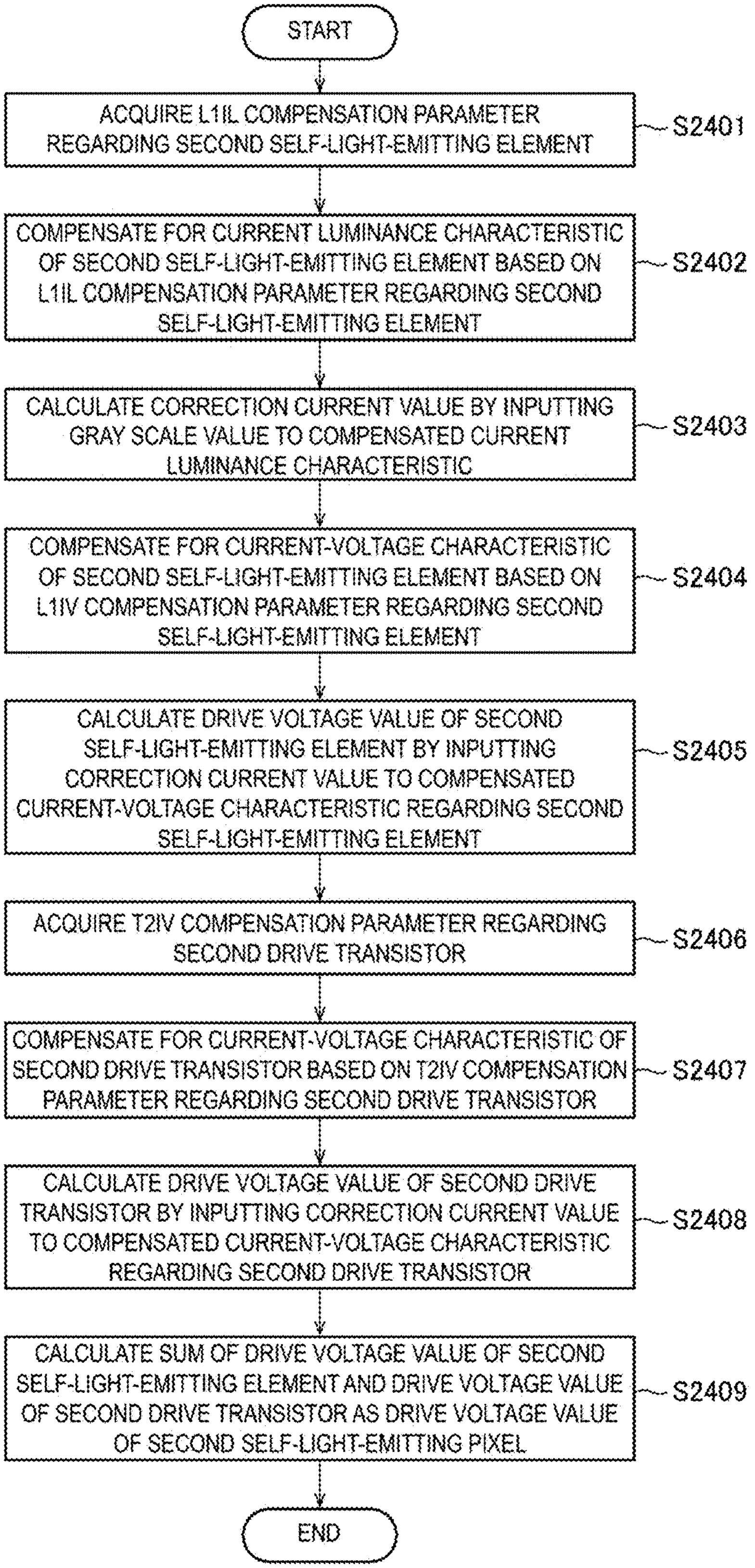
FIG. 24 is a flowchart showing an example of second compensation in the control device according to the third embodiment.

Next, the second compensation regarding the second self-light-emitting pixel 103*b* will be described with reference to FIG. 24. FIG. 24 is a flowchart showing an example of the second compensation in the control device 101 according to the present embodiment. In the description regarding FIG. 24, the first self-light-emitting element L1*a*, the second self-light-emitting element L1*b*, the first drive transistor T2*a*, and the second drive transistor T2*b* are the same as those in the description regarding FIG. 9.

In step S2401, the compensation processing unit 2002 acquires the L1IL compensation parameter 2011*b* regarding the second self-light-emitting element L1*b* from the memory 113.

In step S2402, the compensation processing unit 2002 compensates the current luminance characteristic of the second self-light-emitting element L1*b* based on the L1IL compensation parameter 2011*b*. That is, the second compensation includes compensating for a temporal change in the current luminance characteristic of the second self-light-emitting element L1*b* based on the second compensation parameter 124*b* calculated based on the first state data 121*a* and the second state data 121*b*. The compensation processing unit 2002 according to the present embodiment can simplify the processing as compared with other embodiments by compensating for a temporal change in the current luminance characteristic of the second self-light-emitting element L1*b* based on the L1IL compensation parameter 2011*b* saved in the memory 113.

In step S2403, the compensation processing unit 2002 calculates a correction current value of the second self-light-emitting element L1*b* by inputting the gray scale value regarding the second self-light-emitting pixel 103*b* of the compensation target to the current luminance characteristic compensated in step S2402, regarding the second self-light-emitting element L1*b*.

In step S2404, the compensation processing unit 2002 compensates the current-voltage characteristic of the second self-light-emitting element L1*b* based on the L1IV compensation parameter 125*b*.

In step S2405, the compensation processing unit 2002 calculates the voltage value of the voltage of the second self-light-emitting element L1*b* by inputting the correction current value calculated in step S2403 to the current-voltage characteristic compensated in step S2404 regarding the second self-light-emitting element L1*b*.

In step S2406, the compensation processing unit 2002 acquires the T2IV compensation parameter 126*b* regarding the second drive transistor T2*b* from the memory 113.

In step S2407, the compensation processing unit 2002 compensates the current-voltage characteristic of the second drive transistor T2*b* based on the T2IV compensation parameter 126*b*.

In step S2408, the compensation processing unit 2002 calculates the voltage value of the voltage of the second drive transistor T2*b* by inputting the correction current value calculated in step S2403 to the current-voltage characteristic compensated in step S2407 regarding the second drive transistor T2*b*.

In step S2409, the compensation processing unit 2002 calculates, as the drive voltage value 128*b* of the second self-light-emitting pixel 103*b*, the sum of the voltage value of the voltage of the second self-light-emitting element L1*b* calculated in step S2405 and the voltage value of the voltage of the second drive transistor T2*b* calculated in step S2408.

Figure 25:
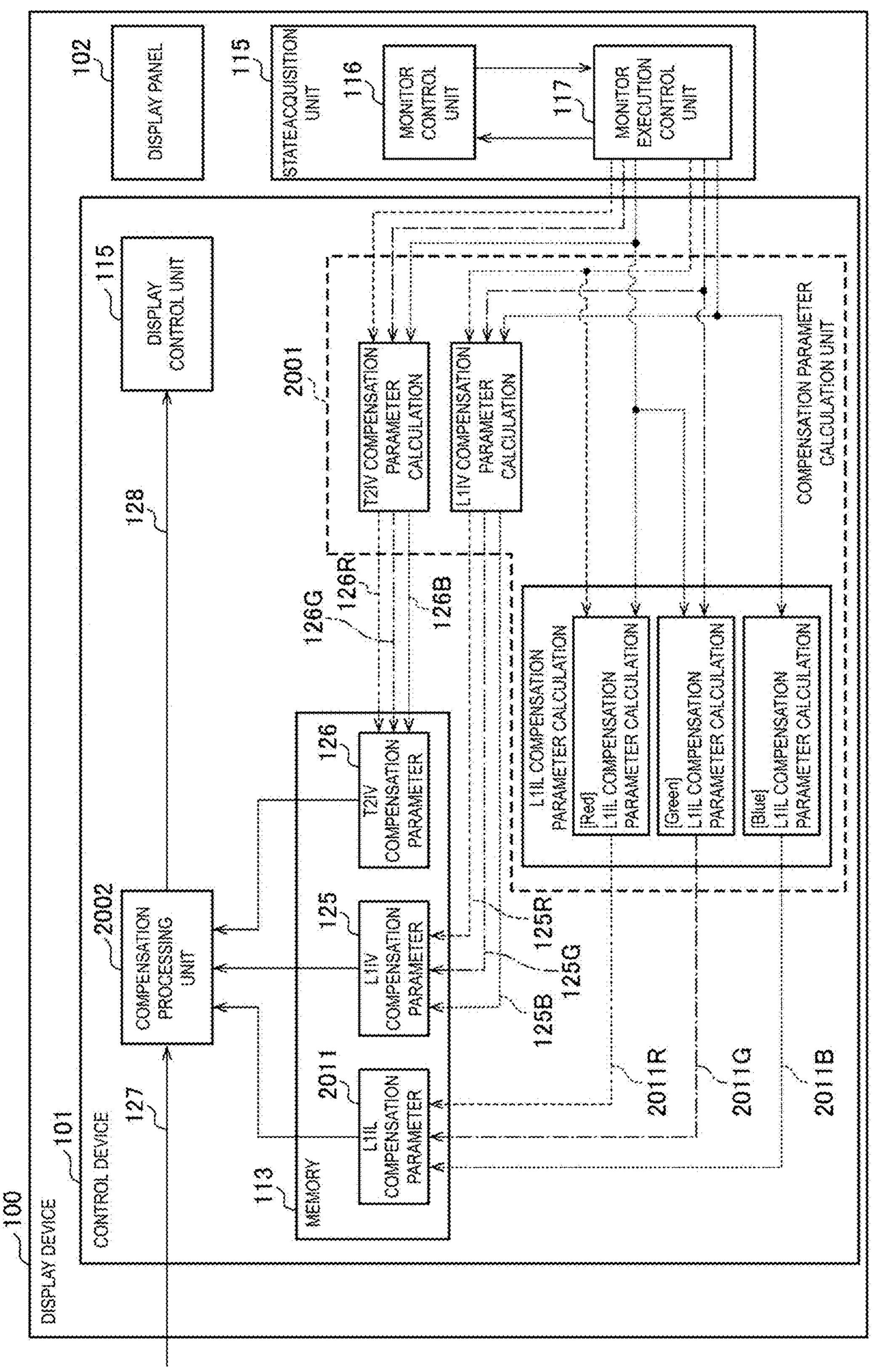
FIG. 25 is a block diagram for explaining operation of a compensation parameter calculation unit in a case where the first self-light-emitting pixel is a blue subpixel and the second self-light-emitting pixel is a red subpixel and a green subpixel.

FIG. 25 is a block diagram for explaining the operation of the compensation parameter calculation unit 2001 in a case where the first self-light-emitting pixel 103*a* is a blue subpixel and the second self-light-emitting pixel 103*b* is a red subpixel and a green subpixel. Note that the L1IV compensation parameter 125R, the L1IV compensation parameter 125G, the L1IV compensation parameter 125B, the T2IV compensation parameter 126R, the T2IV compensation parameter 126G, and the T2IV compensation parameter 126B are similar to those in the other embodiments, and therefore detailed description thereof will be omitted.

The compensation parameter calculation unit 2001 calculates an L1IL compensation parameter 2011B regarding the blue subpixel based on the state of the first self-light-emitting element L1*a* included in the blue subpixel, regarding the first self-light-emitting element L1*a* included in the blue subpixel ("[Blue] L1IL compensation parameter calculation" of the compensation parameter calculation unit 2001).

The compensation parameter calculation unit 2001 calculates an L1IL compensation parameter 2011R regarding the red subpixel based on the state of the second self-light-emitting element L1*b* included in the red subpixel and the state of the first drive transistor T2*a* included in the blue subpixel, regarding the second self-light-emitting element L1*b* included in the red subpixel ("[Red] L1IL compensation parameter calculation" of the compensation parameter calculation unit 2001). The compensation parameter calculation unit 2001 calculates an L1IL compensation parameter 2011G regarding the green subpixel based on the state of the second self-light-emitting element L1*b* included in the green subpixel and the state of the first drive transistor T2*a* included in the blue subpixel, regarding the second self-light-emitting element L1*b* included in the green subpixel ("[Green] L1IL compensation parameter calculation" of the compensation parameter calculation unit 2001). That is, regarding the red subpixel and the green subpixel that are the second self-light-emitting pixels 103*b*, the L1IL compensation parameter 2011R and the L1IL compensation parameter 2011G are calculated using the state of the first drive transistor T2*a* included in the blue subpixel.

Figure 26:
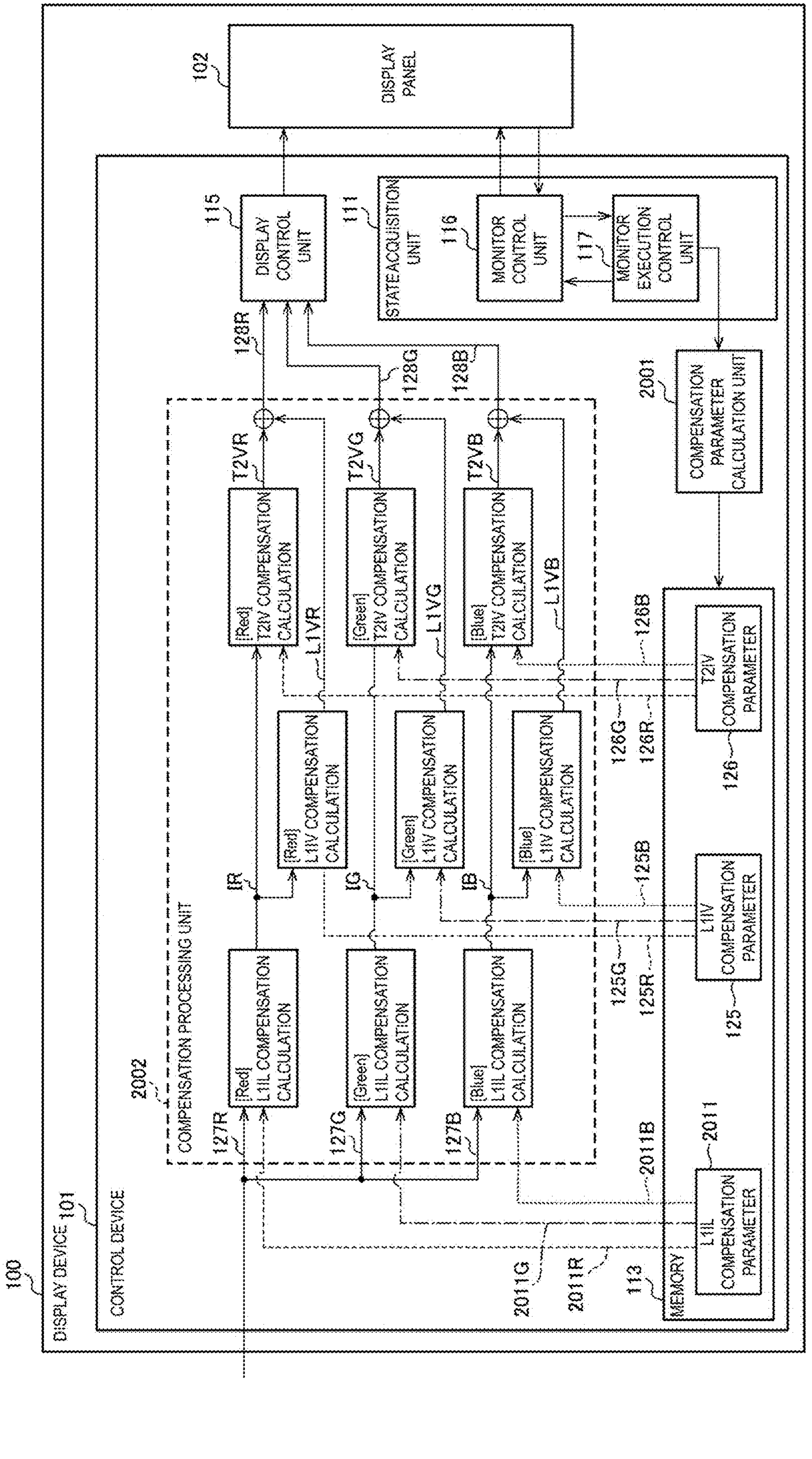
FIG. 26 is a view for explaining operation of a compensation processing unit in a case where the first self-light-emitting pixel is a blue subpixel and the second self-light-emitting pixel is a red subpixel and a green subpixel.

FIG. 26 is a view for explaining the operation of the compensation processing unit 2002 in a case where the first self-light-emitting pixel 103*a* is a blue subpixel and the second self-light-emitting pixel 103*b* is a red subpixel and a green subpixel.

The compensation processing unit 2002 calculates the luminous efficiency compensation ratio based on the L1IL compensation parameter 2011R, regarding the red subpixel that is the second self-light-emitting pixel 103*b* ("[Red] L1IL compensation calculation" of the compensation processing unit 2002). The compensation processing unit 2002 calculates the luminous efficiency compensation ratio based on the L1IL compensation parameter 2011G, regarding the green subpixel that is the second self-light-emitting pixel 103*b* ("[Green] L1IL compensation calculation" of the compensation processing unit 2002). The compensation processing unit 2002 calculates the luminous efficiency compensation ratio based on the L1IL compensation parameter 2011B, regarding the blue subpixel that is the second self-light-emitting pixel 103*b* ("[Blue] L1IL compensation calculation" of the compensation processing unit 2002). Regarding the red subpixel, the green subpixel, and the blue subpixel, the subsequent processing is the same as that of the configuration of the display device illustrated in FIG. 14, and therefore detailed description thereof will be omitted.

Fourth Embodiment

The fourth embodiment will be described with reference to FIGS. 27 to 32. Note that in the drawings, identical or equivalent elements are given an identical reference sign, and redundant descriptions thereof may be omitted. Configurations and processing having substantially common functions to those of the other embodiments will be referred to by common reference signs, description thereof will be omitted, and differences from the other embodiments will be described.

Figure 27:
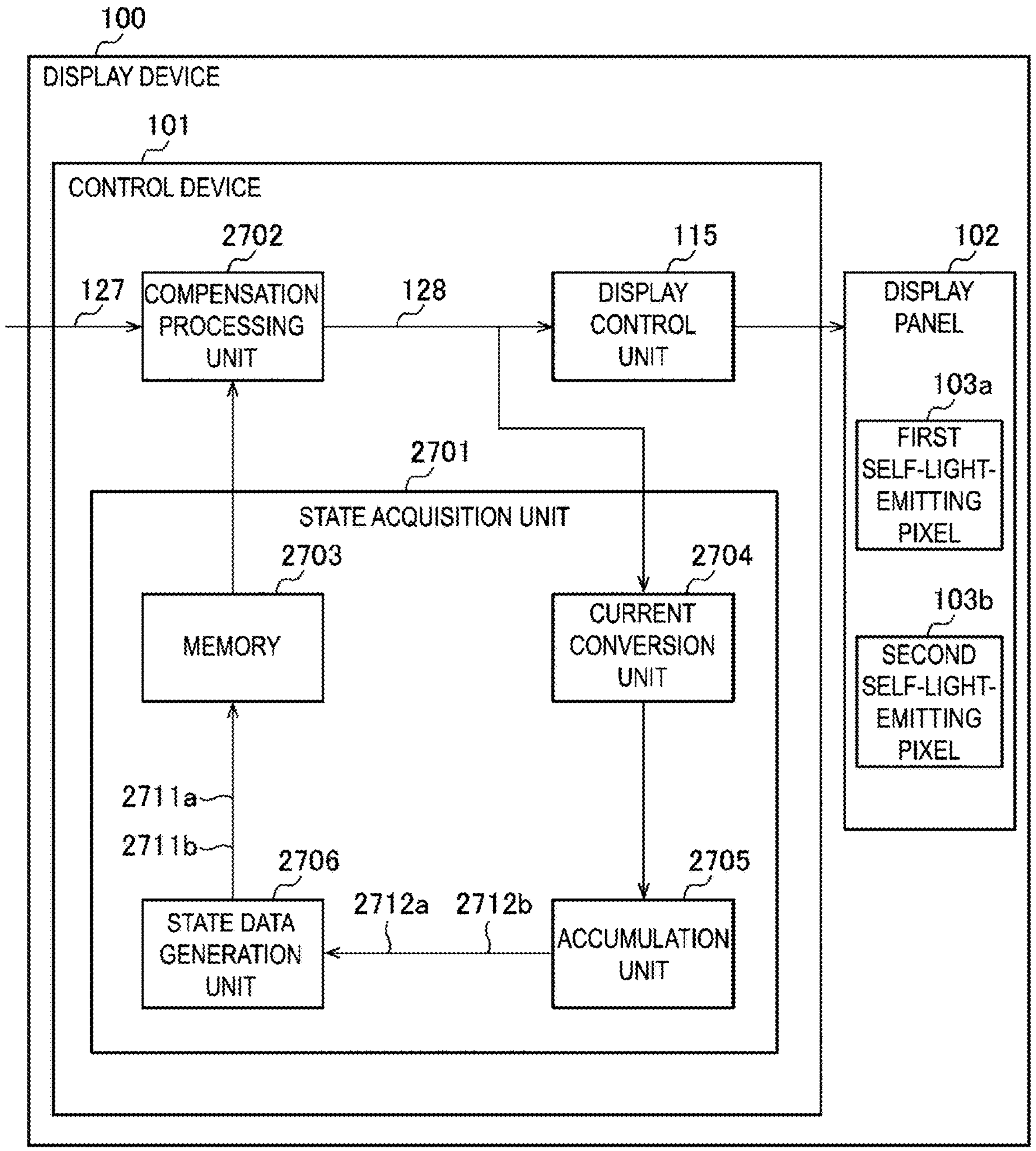
FIG. 27 is a block diagram illustrating an example of a configuration of a display device according to a fourth embodiment.

FIG. 27 is a block diagram illustrating an example of the configuration of the display device 100 according to the present embodiment. A difference between the display device 100 illustrated in FIG. 27 and the display device 100 illustrated in FIG. 1 lies in that the display device 100 illustrated in FIG. 27 includes a state acquisition unit 2701 and a compensation processing unit 2702 in place of the state acquisition unit 111 and the compensation processing unit 114.

The state acquisition unit 2701 acquires first state data 2711*a* by accumulating usage of the first self-light-emitting pixel 103*a* and acquires second state data 2711*b* by accumulating usage of the second self-light-emitting pixel 103*b*.

The state acquisition unit 2701 includes a memory 2703, a current conversion unit 2704, an accumulation unit 2705, and a state data generation unit 2706. For example, the current conversion unit 2704, the accumulation unit 2705, and the state data generation unit 2706 may be implemented by a logic circuit such as an ASIC or an FPGA, or may be implemented by software using a processor such as a CPU.

The memory 2703 is a storage medium that stores data in a nonvolatile manner. For example, the memory 2703 is a flash ROM.

The current conversion unit 2704 converts the usage of the first self-light-emitting pixel 103*a* into a current value 2712*a*. Similarly, the current conversion unit 2704 converts the usage of the second self-light-emitting pixel 103*b* into a current value 2712*b*.

The accumulation unit 2705 accumulates the usage of the first self-light-emitting pixel 103*a*. Specifically, the accumulation unit 2705 accumulates the current value 2712*a*. Similarly, the accumulation unit 2705 accumulates the usage of the second self-light-emitting pixel 103*b*. Specifically, the accumulation unit 2705 accumulates the current value 2712*b*.

The state data generation unit 2706 calculates the first state data 2711*a* based on the accumulated current value 2712*a*. Similarly, the state data generation unit 2706 calculates the second state data 2711*b* based on the accumulated current value 2712*b*.

The compensation processing unit 2702 performs the first compensation of compensating for a temporal change in the first self-light-emitting pixel 103*a* based on the first state data 2711*a*. Furthermore, the compensation processing unit 2702 performs the second compensation of compensating for a temporal change of the second self-light-emitting pixel 103*b* based on the first state data 2711*a* and the second state data 2711*b*.

Figure 28:
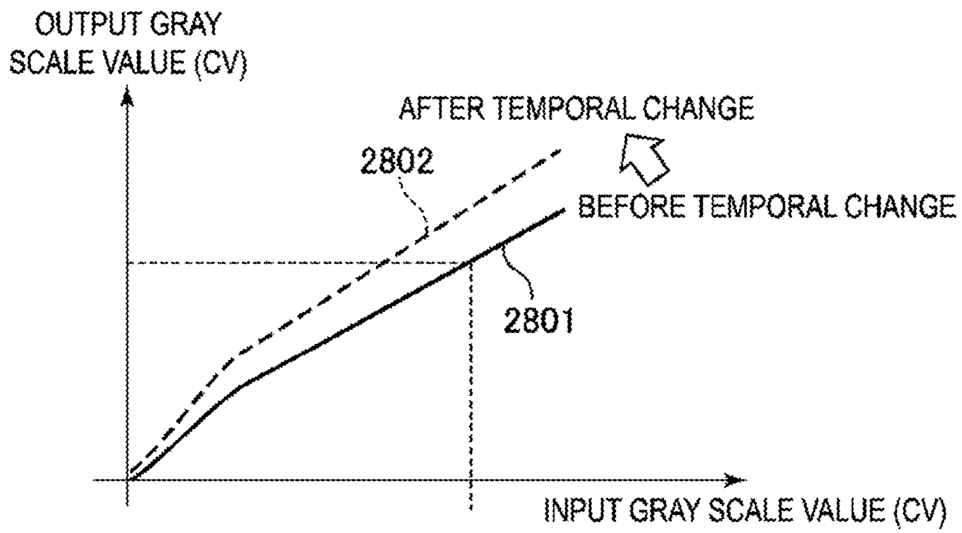
FIG. 28 is a view showing an example of a relationship between an input gray scale value and an output gray scale value before a temporal change, and an example of a relationship between an input gray scale value and an output gray scale value after the temporal change.

FIG. 28 is a view showing a graph 2801 showing an example of the relationship between an input gray scale value before a temporal change and a compensated output gray scale value, and a graph 2802 showing an example of the relationship between an input gray scale value and an output gray scale value after a temporal change, regarding the compensation processing of the current luminance characteristic of the self-light-emitting element L1 in the compensation processing unit 2702. In FIG. 28, the horizontal axis represents the input gray scale value, and the vertical axis represents the output gray scale value. As shown in FIG. 28, it is necessary to perform compensation such that a gray scale value higher than that before the temporal change is output after the temporal change. Due to this, it is necessary to perform compensation such that after the temporal change, the self-light-emitting element L1 emits light with a luminance similar to that before the temporal change.

Figure 29:
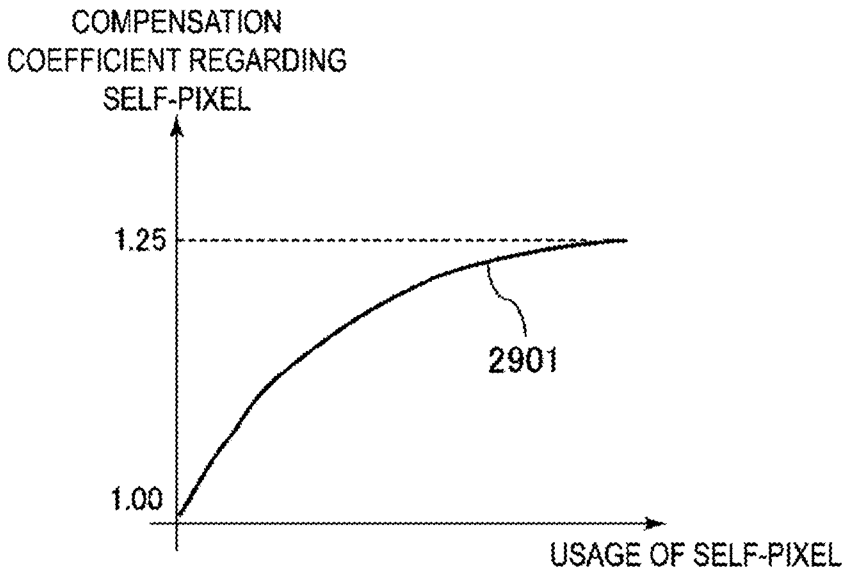
FIG. 29 is a view illustrating an example of a relationship between usage of a self-light-emitting pixel and a compensation coefficient regarding the self-light-emitting pixel itself.

FIG. 29 is a view showing a graph 2901 showing an example of the relationship between usage of the self-light-emitting pixel 103 and a compensation coefficient (compensation coefficient regarding a self-pixel; hereinafter, also called a first compensation coefficient) regarding the self-light-emitting pixel 103 itself. In FIG. 29, the horizontal axis represents the usage of the self-light-emitting pixel 103, and the vertical axis represents the compensation coefficient (first compensation coefficient) regarding the self-pixel. As shown in FIG. 29, the more the usage of the self-light-emitting pixel 103 increases, the larger the value of the first compensation coefficient becomes. It is assumed that the value of the first compensation coefficient is 1.00 at a use start time point of the self-light-emitting pixel 103, for example. On the other hand, as shown in FIG. 29, when the usage of the self-light-emitting pixel 103 increases, the value of the first compensation coefficient is 1.25.

Figure 30:
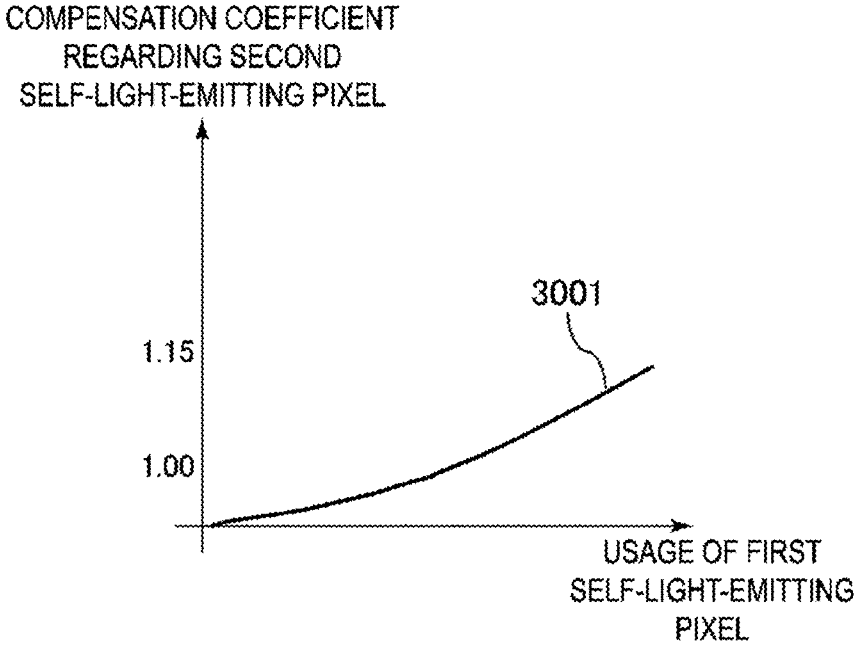
FIG. 30 is a view showing an example of a relationship between usage of a first self-light-emitting pixel at a predetermined position from a second self-light-emitting pixel and a compensation coefficient regarding the second self-light-emitting pixel.

FIG. 30 is a view showing a graph 3001 showing an example of the relationship between usage of the first self-light-emitting pixel 103*a* that is at a predetermined position from the second self-light-emitting pixel 103*b* and a compensation coefficient (hereinafter, also called a second compensation coefficient) regarding the second self-light-emitting pixel 103*b*. In FIG. 30, the horizontal axis represents the usage of the first self-light-emitting pixel 103*a*, and the vertical axis represents the compensation coefficient (second compensation coefficient) regarding the second self-light-emitting pixel 103*b*. As shown in FIG. 30, the more the usage of the first self-light-emitting pixel 103*a* increases, the larger the value of the second compensation coefficient becomes. It is assumed that the value of the second compensation coefficient is 1.00 at a use start time point of the first self-light-emitting pixel 103*a*, for example. On the other hand, when the usage of the first self-light-emitting pixel 103*a* increases, the value of the second compensation coefficient is 1.15.

As described above, the compensation processing unit 2702 performs the first compensation of compensating for a temporal change in the first self-light-emitting pixel 103*a* based on the first state data 2711*a*. More specifically, for example, the compensation processing unit 2702 performs the first compensation based on the first compensation coefficient shown in FIG. 29, regarding the first self-light-emitting pixel 103*a*. For example, a case where the usage of a certain first self-light-emitting pixel 103*a* is large will be considered. At this time, it is assumed that the first compensation coefficient of the first self-light-emitting pixel 103*a* is 1.25. Then, the compensation processing unit 2702 calculates a final compensation coefficient (this is the compensation coefficient used for the first compensation in the present embodiment) of the first self-light-emitting pixel 103*a* as 1.25.

On the other hand, as described above, the compensation processing unit 2702 performs the second compensation of compensating for a temporal change of the second self-light-emitting pixel 103*b* based on the first state data 2711*a* and the second state data 2711*b*. More specifically, for example, the compensation processing unit 2702 performs the second compensation based on the first compensation coefficient shown in FIG. 29 regarding the second self-light-emitting pixel 103*b* and the second compensation coefficient shown in FIG. 30 regarding the first self-light-emitting pixel 103*a* that is at a predetermined position from the second self-light-emitting pixel 103*b*. For example, a case where the usage of both a certain second self-light-emitting pixel 103*b* and the first self-light-emitting pixel 103*a* at a predetermined position are large will be considered. At this time, it is assumed that the first compensation coefficient of the second self-light-emitting pixel 103*b* is 1.25 and the second compensation coefficient thereof is 1.15. Then, the compensation processing unit 2702 calculates a final compensation coefficient (this is the compensation coefficient used for the second compensation in the present embodiment) of the second self-light-emitting pixel 103*b* as the first compensation coefficient×the second compensation coefficient=1.4375. Such the processing is performed because, as described above, it is considered that the light emission of the first self-light-emitting pixel 103*a* that is at a predetermined position from the second self-light-emitting pixel 103*b* affects the deterioration of the second self-light-emitting pixel 103*b*.

Figure 31:
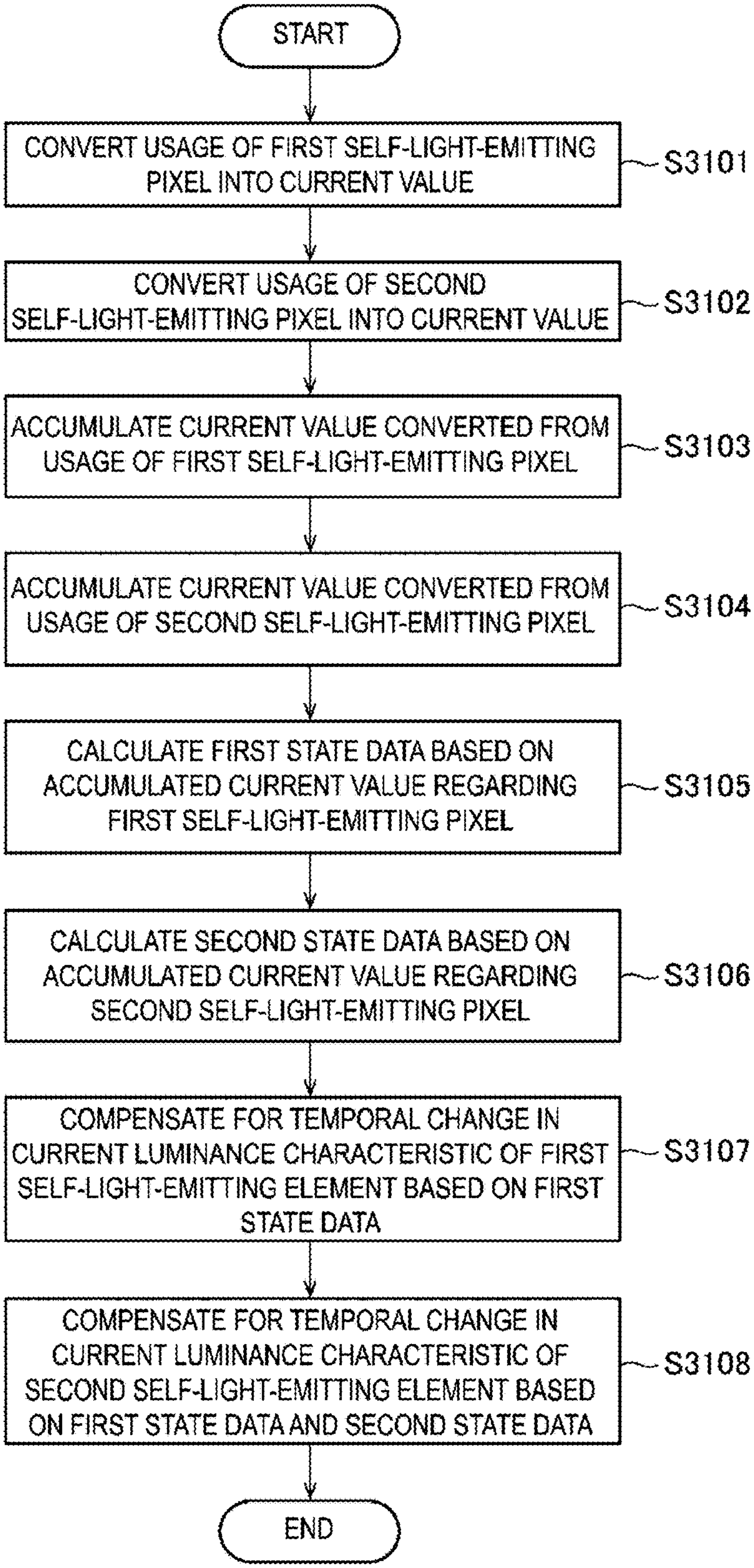
FIG. 31 is a flowchart showing an example of operation of a control device according to the fourth embodiment.

Next, the processing of the first compensation of the first self-light-emitting pixel 103*a* of the measurement target and the processing of the second compensation of the second self-light-emitting pixel 103*b* of the measurement target will be described with reference to FIG. 31. FIG. 31 is a flowchart showing an example of the operation of the control device 101 according to the present embodiment.

In step S3101, the current conversion unit 2704 converts the usage of the first self-light-emitting pixel 103*a* into the current value 2712*a*. Specifically, the current conversion unit 2704 converts the usage indicated by the output gray scale value of the first self-light-emitting pixel 103*a* into the current value 2712*a*. For example, the higher the output gray scale value of the first self-light-emitting pixel 103*a* is, the larger the current value 2712*a* is.

For example, the current conversion unit 2704 converts the usage indicated by the output gray scale value of the first self-light-emitting pixel 103*a* into the current value 2712*a* at a predetermined frame interval. For example, when the predetermined frame interval is 60 frame intervals and the control device 101 acquires an input image at 60 frames per second (fps), the current conversion unit 2704 converts the usage indicated by the output gray scale value of the first self-light-emitting pixel 103*a* into the current value 2712*a* at intervals of one second.

In step S3102, the current conversion unit 2704 converts the usage of the second self-light-emitting pixel 103*b* into the current value 2712*b* at the same time interval as that of the first self-light-emitting pixel 103*a*. Specifically, the current conversion unit 2704 converts the usage indicated by the output gray scale value of the second self-light-emitting pixel 103*b* into the current value 2712*b*. For example, the larger the output gray scale value of the second self-light-emitting pixel 103*b* is, the larger the current value 2712*b* is.

In step S3103, the accumulation unit 2705 accumulates the current value 2712*a* converted in step S3101. Specifically, the accumulation unit 2705 includes a memory having a predetermined capacity regarding each of the first self-light-emitting pixels 103*a* and each of the second self-light-emitting pixels 103*b*. For example, it is assumed that in a case where the first self-light-emitting pixel 103*a* emits the first color light at the output gray scale value, the current conversion unit 2704 converts the current value 2712*a* that is 8 bits. Then, it is assumed that the accumulation unit 2705 includes a 20-bit memory for each of the first self-light-emitting pixels 103*a*, and the first self-light-emitting pixel 103*a* continuously emits the first color light at the maximum gray scale value. In that case, in the accumulation unit 2705, the memory regarding the first self-light-emitting pixel 103*a* reaches the upper limit of the capacity in about 68 minutes.

In step S3104, the accumulation unit 2705 accumulates the current value 2712*b* converted in step S3102.

In step S3105, the state data generation unit 2706 calculates the first state data 2711*a* based on the current value 2712*a* accumulated in step S3103. For example, in a case where the current value 2712*a* accumulated in the accumulation unit 2705 exceeds a predetermined threshold, the state data generation unit 2706 increases and saves, into the memory 2703, the value of the first state data 2711*a*. Then, the state data generation unit 2706 sets the current value 2712*a* accumulated in the accumulation unit 2705 to 0. By the processing of steps S3101, S3103, and S3105, the state acquisition unit 2701 accumulates the usage of the first self-light-emitting pixel 103*a* and acquires the first state data 2711*a*.

In step S3106, the state data generation unit 2706 calculates the second state data 2711*b* based on the current value 2712*b* accumulated in step S3104. For example, in a case where the current value 2712*b* accumulated in the accumulation unit 2705 exceeds a predetermined threshold, the state data generation unit 2706 increases and saves, into the memory 2703, the value of the second state data 2711*b*. Then, the state data generation unit 2706 sets the current value 2712*b* accumulated in the accumulation unit 2705 to 0. By the processing of steps S3102, S3104, and S3106, the state acquisition unit 2701 accumulates the usage of the second self-light-emitting pixel 103*b* and acquires the second state data 2711*b*.

In step S3107, the compensation processing unit 2702 compensates for a temporal change in the current luminance characteristic of the first self-light-emitting element L1*a* based on the first state data 2711*a* calculated in step S3105 as the first compensation. Specifically, the compensation processing unit 2702 performs the first compensation by calculating a compensation coefficient regarding the first self-light-emitting pixel 103*a* based on the usage of the first self-light-emitting pixel 103*a* indicated by the first state data 2711*a*, and compensating for a temporal change in the current luminance characteristic of the first self-light-emitting pixel 103*a* based on the compensation coefficient.

In step S3108, the compensation processing unit 2702 compensates for a temporal change in the current luminance characteristic of the second self-light-emitting element L1*b* based on the first state data 2711*a* calculated in step S3105 and the second state data 2711*b* calculated in step S3106 as the second compensation. Specifically, the compensation processing unit 2702 performs the second compensation by calculating a compensation coefficient regarding the second self-light-emitting pixel 103*b* based on the usage of the first self-light-emitting pixel 103*a* indicated by the first state data 2711*a* and the usage of the second self-light-emitting pixel 103*b* indicated by the second state data 2711*b*, and compensating for a temporal change in the current luminance characteristic of the second self-light-emitting pixel 103*b* based on the compensation coefficient.

Figure 32:
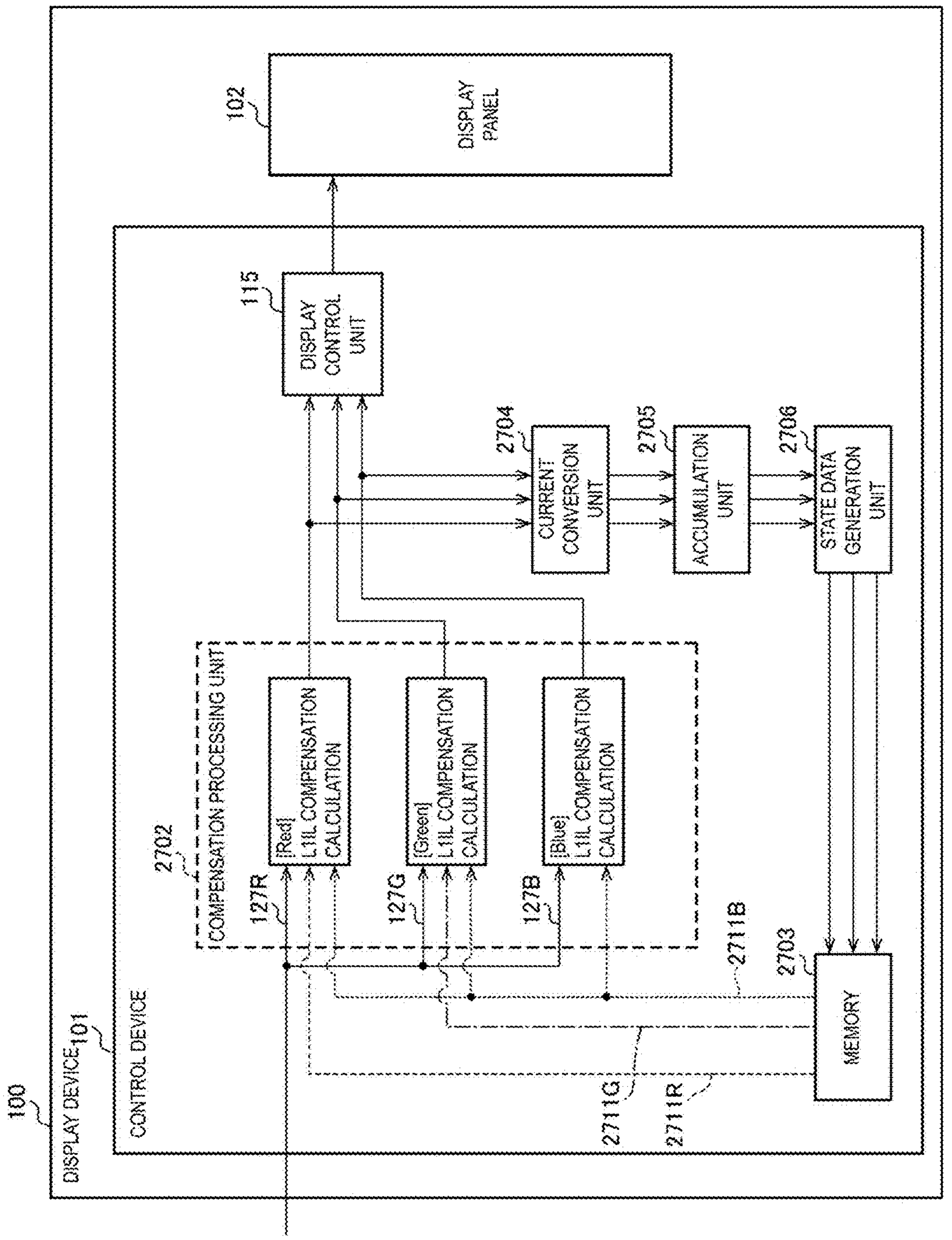
FIG. 32 is a block diagram illustrating an example of a configuration of a display device according to the fourth embodiment in a case where the first self-light-emitting pixel is a blue subpixel and the second self-light-emitting pixel is a red subpixel and a green subpixel.

FIG. 32 is a block diagram illustrating an example of the configuration of the display device 100 according to the present embodiment in a case where the first self-light-emitting pixel 103*a* is a blue subpixel and the second self-light-emitting pixel 103*b* is a red subpixel and a green subpixel. In the following description, the processing in the compensation processing unit 2702 will be described.

The compensation processing unit 2702 compensates for the current luminance characteristic of the second self-light-emitting element L1*b* based on the first state data 2711*a* and the second state data 2711*b* as the second compensation regarding the second self-light-emitting element L1*b* included in the red subpixel that is the second self-light-emitting pixel 103*b* ("[Red] L1IL compensation calculation" of the compensation processing unit 2702). Specifically, the compensation processing unit 2702 obtains the first compensation coefficient described with reference to FIG. 29 based on second state data 2711R regarding the red subpixel, regarding the second self-light-emitting element L1*b* included in the red subpixel. The compensation processing unit 2702 obtains the second compensation coefficient described with reference to FIG. 30 based on first state data 2711B regarding the blue subpixel that is at a predetermined position from the red subpixel, regarding the second self-light-emitting element L1*b* included in the red subpixel. Then, the compensation processing unit 2702 calculates, from the first compensation coefficient and the second compensation coefficient, a compensation coefficient used for the second compensation regarding the second self-light-emitting element L1*b* included in the red subpixel.

The compensation processing unit 2702 compensates for the current luminance characteristic of the second self-light-emitting element L1*b* based on the first state data 2711*a* and the second state data 2711*b* as the second compensation regarding the second self-light-emitting element L1*b* included in the green subpixel that is the second self-light-emitting pixel 103*b* ("[Green] L1IL compensation calculation" of the compensation processing unit 2702). The specific processing is similar to the processing of the second compensation regarding the red subpixel, and therefore detailed description thereof will be omitted.

The compensation processing unit 2702 compensates for the current luminance characteristic of the first self-light-emitting element L1*a* based on the first state data 2711*a* as the first compensation regarding the first self-light-emitting element L1*a* included in the blue subpixel that is the first self-light-emitting pixel 103*a* ("[Blue] L1IL compensation calculation" of the compensation processing unit 2702). Specifically, the compensation processing unit 2702 obtains the first compensation coefficient based on the first state data 2711B regarding the blue subpixel, regarding the first self-light-emitting element L1*a* included in the blue subpixel. Then, the compensation processing unit 2702 calculates, from the first compensation coefficient, a compensation coefficient used for the first compensation regarding the first self-light-emitting element L1*a* included in the blue subpixel.

As described above, the control device 101 according to the present embodiment can compensate for a temporal change in the current luminance characteristic of the first self-light-emitting pixel 103*a* and a temporal change in the current luminance characteristic of the second self-light-emitting pixel 103*b* in accordance with the usage of the first self-light-emitting pixel 103*a* and the usage of the second self-light-emitting pixel 103*b* without measuring the electrical characteristics of the first self-light-emitting pixel 103*a* and the second self-light-emitting pixel 103*b*.

The disclosure is not limited to the above-described embodiments, and various modifications can be made within the scope indicated in the claims, and embodiments obtained by appropriately combining the technical approaches disclosed in different embodiments are also included in the technical scope of the disclosure. Moreover, novel technical features can be formed by combining the technical approaches disclosed in each of the embodiments.

The invention claimed is:

1. A control device comprising:

a compensation processing unit in which after a first display is performed in a first region included in a display panel including a plurality of first self-light-emitting pixels configured to emit first color light and a plurality of second self-light-emitting pixels configured to emit second color light longer in wavelength than the first color light, and after a second display is performed in a second region included in the display panel, a voltage to be applied to a second self-light-emitting pixel included in the second region is made higher than a voltage to be applied to a second self-light-emitting pixel included in the first region, in the first display, a first self-light-emitting pixel included in the first region emits the first color light at a first grayscale value, and a second self-light-emitting pixel included in the first region emits light at a second grayscale value higher than the first grayscale value, and in the second display, a first self-light-emitting pixel and a second self-light-emitting pixel included in the second region emit light at the second grayscale value.

* * * * *